United States Patent
Henry

(10) Patent No.: US 11,505,013 B2
(45) Date of Patent: Nov. 22, 2022

(54) ELECTRONIC CONTROL MODULE FOR A TIRE INFLATION SYSTEM

(71) Applicant: Equalaire Systems, Inc., Corpus Christi, TX (US)

(72) Inventor: Dane Henry, Windcrest, TX (US)

(73) Assignee: Pressure Systems International, LLC, San Antonio, TX (US)

( * ) Notice: Subject to any disclaimer, the term of this patent is extended or adjusted under 35 U.S.C. 154(b) by 116 days.

(21) Appl. No.: 16/631,153

(22) PCT Filed: Jul. 13, 2018

(86) PCT No.: PCT/US2018/042167
§ 371 (c)(1),
(2) Date: Jan. 14, 2020

(87) PCT Pub. No.: WO2019/014640
PCT Pub. Date: Jan. 17, 2019

(65) Prior Publication Data
US 2020/0223264 A1    Jul. 16, 2020

Related U.S. Application Data

(60) Provisional application No. 62/668,604, filed on May 8, 2018, provisional application No. 62/532,565, filed on Jul. 14, 2017.

(51) Int. Cl.
*B60C 23/00* (2006.01)
*B60C 23/02* (2006.01)
*B60C 23/12* (2006.01)

(52) U.S. Cl.
CPC ...... *B60C 23/00354* (2020.05); *B60C 23/002* (2013.01); *B60C 23/004* (2013.01);
(Continued)

(58) Field of Classification Search
CPC .. B60C 23/00354; B60C 23/002; B60C 23/02
See application file for complete search history.

(56) References Cited

U.S. PATENT DOCUMENTS

| 5,273,064 A | * | 12/1993 | Beverly | ............ B60C 23/00354 137/102 |
| 5,629,874 A | * | 5/1997 | Mittal | ............... B60C 23/00354 702/140 |

(Continued)

FOREIGN PATENT DOCUMENTS

| DE | 102012008002 | 10/2013 |
| WO | WO 99/36850 | 7/1999 |

OTHER PUBLICATIONS

International Preliminary Report on Patentability issued in related International Application, PCT/US2018/042167 dated Jan. 14, 2020 (10 pages).

(Continued)

*Primary Examiner* — S. Joseph Morano
*Assistant Examiner* — Emily G. Castonguay
(74) *Attorney, Agent, or Firm* — Pizarro Allen PC

(57) ABSTRACT

An inflation electronic control module for a tire inflation system comprising a solenoid valve disposed so as to selectively open or close fluid communication between a fluid pressure source and a vehicle tire in response to one or more pressure signals. The tire inflation system further comprising a fluid pressure sensor disposed so as to detect delivery-side fluid pressure between the solenoid valve and the vehicle tire, and provide a pressure signal corresponding to the detected fluid pressure.

20 Claims, 14 Drawing Sheets

(52) U.S. Cl.
CPC ............ *B60C 23/009* (2013.01); *B60C 23/02* (2013.01); *B60C 23/12* (2013.01)

(56) References Cited

U.S. PATENT DOCUMENTS

| | | | |
|---|---|---|---|
| 6,144,295 A * | 11/2000 | Adams | ............... B60C 23/00354 |
| | | | 340/442 |
| 7,331,221 B2 | 2/2008 | Wise et al. | |
| 2005/0194080 A1 | 9/2005 | White et al. | |
| 2005/0258680 A1 | 11/2005 | Blackwood et al. | |
| 2006/0053876 A1 | 3/2006 | Claussen et al. | |
| 2008/0271810 A1 | 11/2008 | Shultz et al. | |
| 2013/0306192 A1 * | 11/2013 | Hennig | ............. B60C 23/00354 |
| | | | 141/4 |
| 2015/0096655 A1 | 4/2015 | Koulinitch et al. | |
| 2016/0096402 A1 | 4/2016 | Carlin et al. | |
| 2016/0167456 A1 | 6/2016 | Mozingo et al. | |
| 2016/0318354 A1 | 11/2016 | Trostle et al. | |
| 2018/0178598 A1 * | 6/2018 | Woodley | ................. B60C 23/04 |
| 2018/0312017 A1 | 11/2018 | Woodley et al. | |
| 2018/0319227 A1 | 11/2018 | Abdel-Baset et al. | |

OTHER PUBLICATIONS

International Search Report issued in related International Application, PCT/US2018/042167 dated Sep. 26, 2018 (3 pages).

* cited by examiner

ELECTRONIC CONTROL MODULE FOR A TIRE INFLATION SYSTEM

CROSS-REFERENCE TO RELATED APPLICATIONS

This application is a US national stage entry of International Patent Application Number PCT/US2018/042167 filed Jul. 13, 2018 entitled "ELECTRONIC CONTROL MODULE FOR A TIRE INFLATION SYSTEM," which claims priority to U.S. Provisional Patent Application No. 62/532,565 entitled "ELECTRONIC CONTROL MODULE" filed Jul. 14, 2017, and to U.S. Provisional Patent Application No. 62/668,604 entitled "ELECTRONIC CONTROL MODULE FOR A TIRE INFLATION SYSTEM" filed May 8, 2018, each of which is hereby entirely incorporated herein by reference.

FIELD

This application relates generally to vehicle tire inflation systems.

SUMMARY

An inflation electronic control module comprising a first electronically-controllable solenoid valve disposed so as to selectively open or close fluid communication between a fluid pressure source and a vehicle tire; and a first electronic fluid pressure sensor disposed so as to detect delivery-side fluid pressure between the first electronically-controllable solenoid valve and the vehicle tire, and provide a first pressure signal corresponding to the detected fluid pressure; wherein the first electronically-controllable solenoid valve opens or closes in response to the first pressure signal.

An automatic tire inflation system comprising a fluid pressure source; a vehicle tire; and an electronic control module disposed between and in sealing fluid communication with the fluid pressure source and the vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve.

A method of controlling fluid to a vehicle tire, the method comprising providing an electronic control module between and in sealing fluid communication with a fluid pressure source and a vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve.

A method of controlling fluid to a vehicle tire, the method comprising providing an electronic control module between and in sealing fluid communication with a fluid pressure source and a vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve; and selectively opening or closing the first electronically-controllable solenoid valve based on fluid pressure sensed by the first electronic fluid pressure sensor.

DETAILED DESCRIPTION

Figure 1:
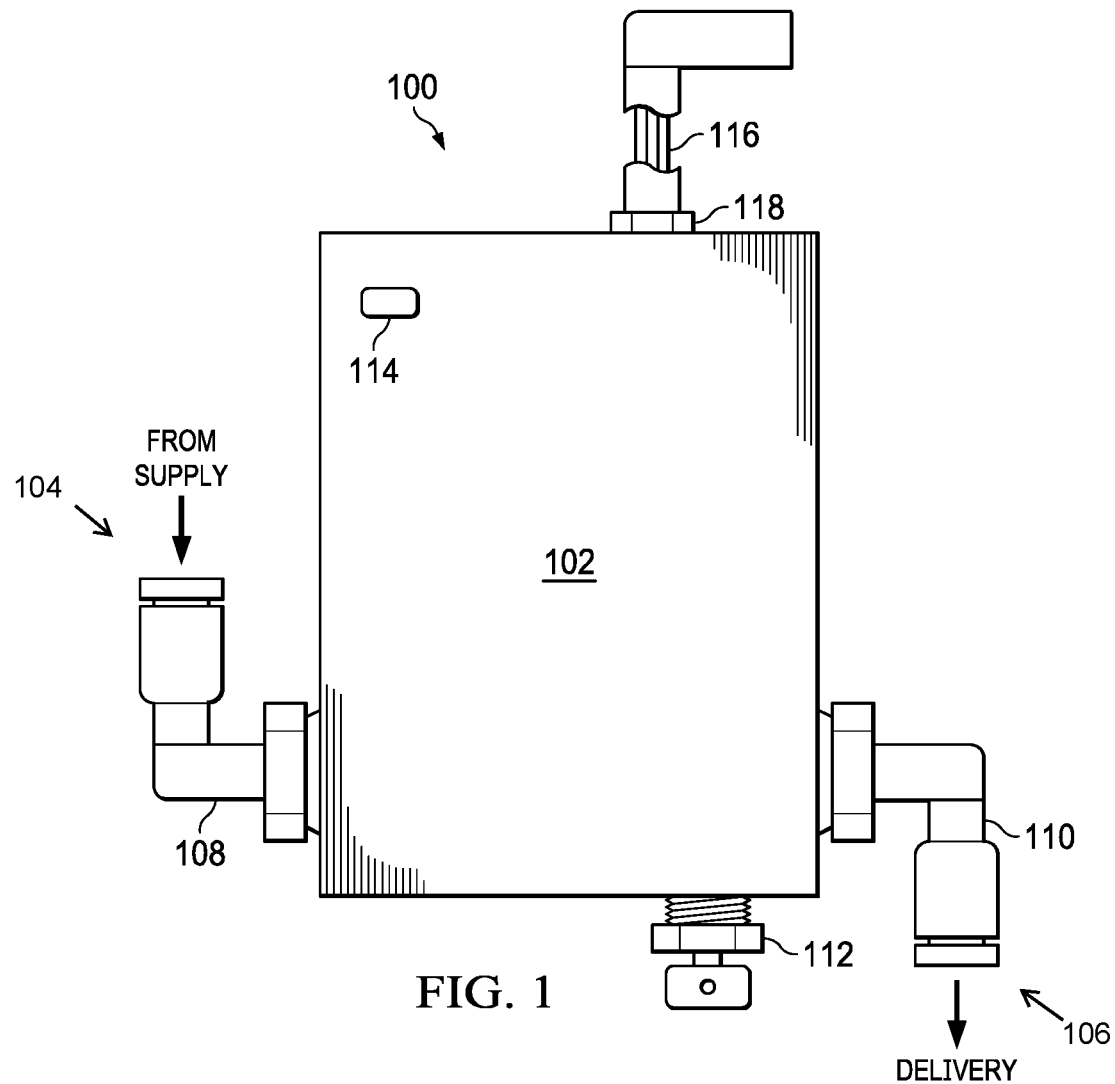
FIG. 1 illustrates an embodiment of an electronic control module for tire inflation systems.

In the embodiment of FIG. 1, an inflation system electronic control module (ECM) 100 may include a housing 102, one or more pressure sensors (not shown), a solenoid valve (not shown), fluid supply and delivery ports 104 and 106, a bleeder valve 112, an indicator lamp 114, and an electronic control board (ECB) (not shown). The solenoid valve may be capable of operating at 10 bars (145.04 psi) of pressure and may be electrically actuatable. The ECM provides a minimum fluid flow capacity suitable for proper inflation of tires associated with the ECM while maintaining constant delivery pressure. For example, an ECM may be able to handle at least 90 liters per minute fluid flow rate. An ECM may be sealed against environmental hazards, and may include a CPU, wireless transceiver, network interface controller, and supporting electronic components for controlling items such as voltage reduction, spikes, polarity protection, inductive kick back clamping, and switching. Additionally, a low voltage cutout capability may be included.

An ECM may be configured so as to operate in adverse weather conditions that may be encountered on roadways while driving. Thus, the ECM may be particularly suitable for vehicles such as class 8 tractors and trailers, and other commercial vehicles. A vehicle may be a towable trailer, or a tow vehicle. The ECM may be similarly suited for use on recreational vehicles. For example, the electronic, fluid related, and other critical components may be configured to reliably function in temperatures ranging from −40 C to 80 C. External electrical connections may utilize environmentally sealed connectors or other weather and other environmentally sealed connectors to reduce operational problems created by precipitation, chemical exposure, extreme temperatures, and other environmental hazards. Filters may be disposed in fluid transfer lines or channels. Such filters may be serviceable to include replacement or cleaning and may include a liquid trap feature so as to aid in ensuring proper functioning of downstream components and systems. There also may be provided a filter bypass included for emergency and maintenance operations.

In some embodiments, ECM serves as an access point or host for a wireless network so as to allow communication between the ECM and other systems or devices. The ECM may utilize a client-server architecture over wireless protocols to achieve such a network. In such an architecture, the ECM may act as the server with other devices in the client role. Client devices may include, but not be limited to, computers, tablets, smartphones, or purpose-built devices for interacting with the ECM. As the server component, the ECM may be the point at which any network configuration changes may be made. Such changes may include the changing of the network password, IP address assignment, SSID naming, and any other function typically associated with the hosting and maintaining of a wireless network. Alternately, the network architecture may be a peer-to-peer architecture, hybrid architecture, or other architecture as found in the field of computer networking. The network may use a WLAN protocol, such as Wi-Fi, to facilitate wireless connectivity of the ECM and other network nodes. The WLAN protocol, Bluetooth, and other alternate protocols may exist as a sole connection protocol or may be used in any combination thereof.

With the ECM as network host, the owner or operator of the ECM may be able to maintain security over the settings and information contained on the ECM. The ECM may thus provide control over access rights to any client device and thus the ECM may not be reliant on the security of a network outside of the control of the owner. Such a feature may allow the ECM the ability to remotely connect to maintenance personnel systems, authorized user mobile devices, and fleet operators without having to be located at a particular facility or location, such as a yard owned by a particular fleet manager.

Installation of the ECM 100 may include mounting to the pressure reservoir of a vehicle tire inflation system, such as directly on the tank or in-line with the reservoir supply line. Alternately, the ECM 100 may be mounted on the frame of a vehicle. In yet another embodiment, the ECM 100 may be mounted internal to or integrated with the pressure supply reservoir. ECM mounting locations may be selected to minimize adverse impact of environmental conditions, such as water ingress and debris strikes.

As seen in FIG. 1, the housing 102 is an enclosure or frame to which other ECM components attach and through which ECM components may interact. The housing includes a supply port 104 and a delivery port 106 for attachment of a fluid supply connector 108 and a fluid delivery connector 110, respectively, wherein said connectors may be of a quick-disconnect style. Other styles of fluid connectors may be utilized such as threaded fittings, compression nuts, push to connect cartridges, and other connectors typically utilized in fluid flows, especially as in tubed, piped, and hosed connection points. The housing may include a fluid channel providing fluid communication between the supply port 104 and a delivery port 106. The supply port connector 108 may couple to a hose, tubing, piping, or other fluid conduit from a pressurized fluid source at the supply port. Likewise, the delivery port connector 110 may couple to a hose, tubing, piping, or other fluid conduit for delivery of the pressurized fluid to further downstream components of a tire inflation system (not shown) which may finally terminate with communication of fluid with the associated tires. A bleeder valve 112, such as a draincock or other closable drain mechanism, is in fluid communication with the fluid channel to as to allow release of fluid from the fluid channel. A bleeder valve 112 may be disposed so as to service the supply side fluid components, or to service the delivery side fluid components, or a bleeder valve 112 may be disposed in both the supply and delivery sections of the fluid flow path. There may also be a drain valve (not shown), such as a draincock, disposed in the housing 102 of the ECM so as to release any water or other fluids that may collect in the interior of the ECM housing 102.

An indicator lamp 114 may be disposed at the exterior of the housing 102 such that the lamp 114 may be readily seen once the ECM 100 is installed on a vehicle. Such an indicator lamp 114 may communicate to a user the status of the ECM 100. For example, the indicator 114 may illuminate upon start-up of the ECM 100 to provide visual confirmation that power is being received by the ECM 100. Further, the indicator lamp 114 may be controlled by an ECB to illuminate or change color, intensity or blink pattern. The indicator lamp 114 may be controlled so that minor events that do not necessarily indicate a problem with a tire, such as filling a tire due to temperature changes or changes in road conditions. For example, the indicator lamp 114 may not illuminate if the system pressure is less than two psi below a threshold pressure (such as the desired tire pressure) even if the tire inflation system is filling the tire. The indicator lamp 114 may be illuminated if the pressure is more than two psi below the threshold and the tire inflation system is filling the tire. In some embodiments, the indicator lamp 114 may remain illuminated for a set period after the tire inflation system has filled the tires to the desired pressure. This prolonged illumination event may allow the bridging of gaps between immediately consecutive fill events, such as two or more tire-filling events for a single tire or the filling of multiple tires in a small window of time. By bridging these closely timed events, confusion between closely spaced events and a purposeful blinking of the lamp may be prevented.

In some embodiments, a blinking lamp may be employed as an indication of a particular event or condition related to the inflation system. Such an indicator lamp may also be used to communicate diagnostic information. For example, initialization system checks may occur and then push a data signal to the indicator lamp. Said signal may result in the flashing of the indicator lamp to communicate whether or not the overall system in functioning properly. In other embodiments, an LED readout may be used to convey system conditions. An example of codes an indicator lamp may use to communicate with a user may be seen in Table 1.

captured from the vehicle, such as vibrations due to the powertrain or vibrations due to road noise. An ECM may be a low voltage system operating in the 8 VDC to 32 VDC range with an optimal range of 9 VDC to 14 VDC. Such low voltage design may enable the ECM to readily integrate with existing vehicle systems. An ECM may also operate at low current ranges to minimize power requirements. For example, an ECM may operate with an amperage draw of 0.5 A or lower.

In other embodiments, the ECM 100 may utilize a hybrid power system. Such a hybrid system may incorporate power from a vehicle system and a power source external to the vehicle as previously disclosed. Such a hybrid system may be configured such that the electronic control module takes advantage of the power source that has the least impact on the vehicle. For example, while the vehicle is in operation (engine is running or vehicle battery is available to supply power) the ECM 100 may utilize power from the vehicle and rely on the non-vehicle power supply in situations where the vehicle is not in operation. Such a hybrid system may allow maintenance operations to be performed without reliance on vehicle power systems or allow continued ECM 100 operation during situations where the vehicle is not operating. Then vehicle power may be utilized during vehicle operation so as to prolong the life of the non-vehicle power supply.

Figure 2A:
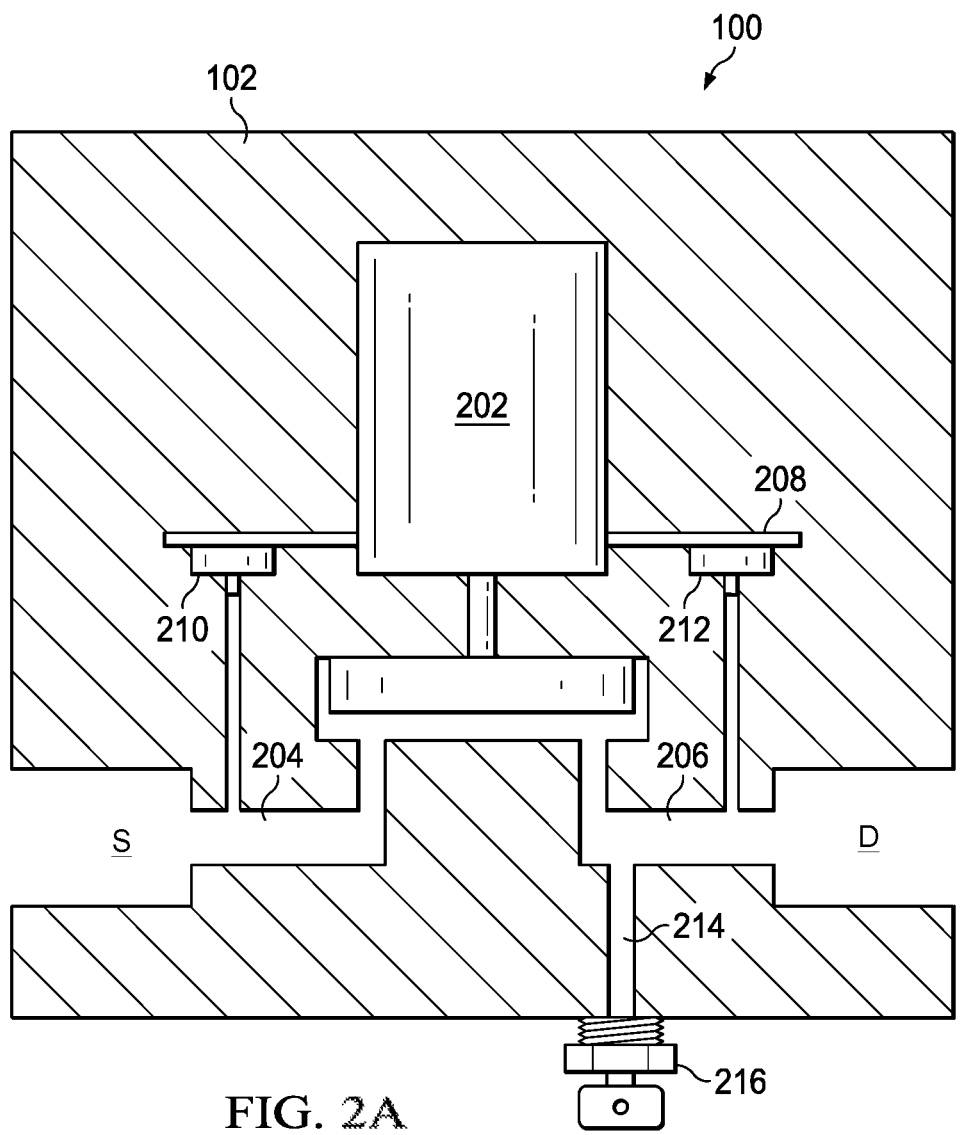
FIG. 2A illustrates an embodiment of a valve system of an electronic control module with a solenoid valve in an open position.
Figure 2B:
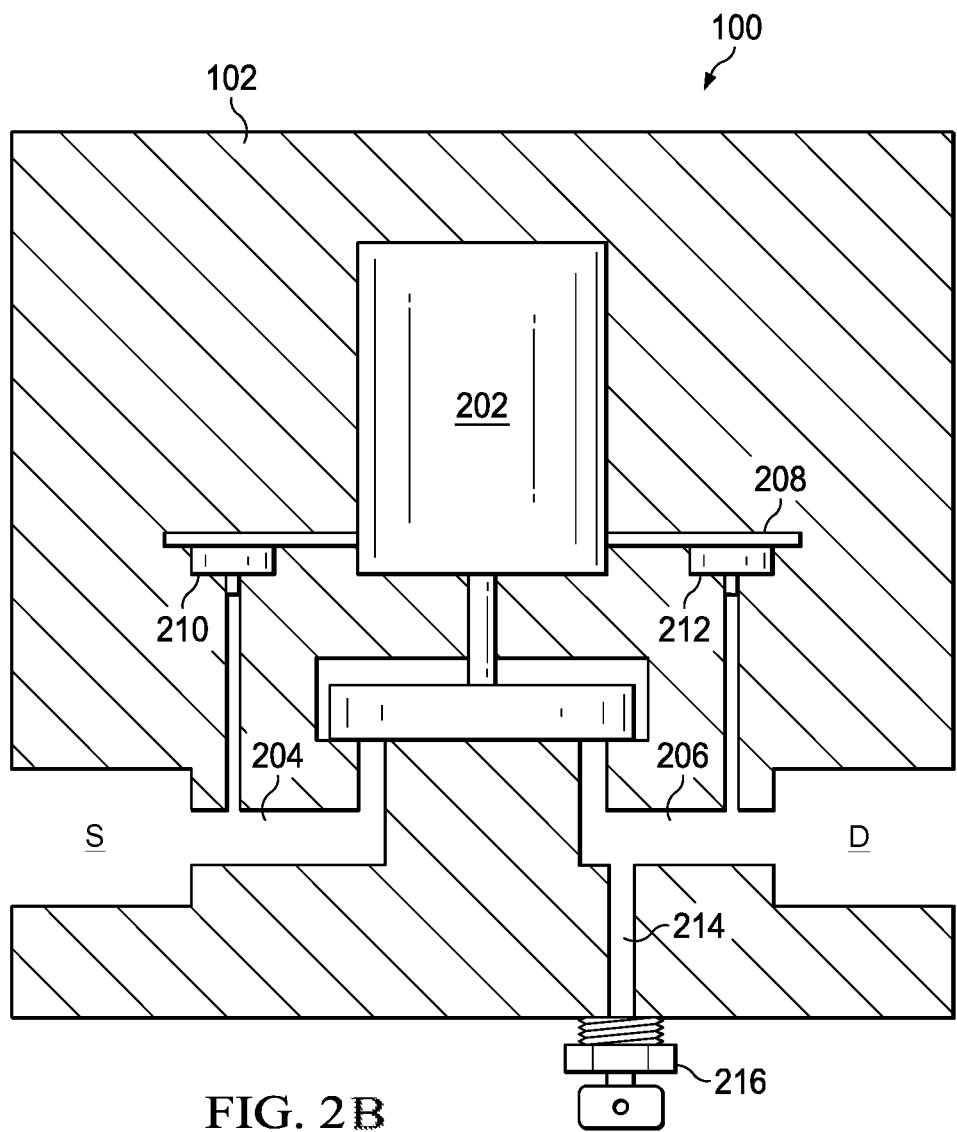
FIG. 2B illustrates an embodiment of a valve system of an electronic control module with a solenoid valve in a closed position.

An embodiment of a valve system of the ECM is illustrated in FIGS. 2A and 2B (external fittings and leads not shown) with FIG. 2A illustrating the solenoid valve 202 in an open position and FIG. 2B illustrating the solenoid valve 202 in a closed position. The valve system is disposed in the ECM housing 102 in which fluid channels 204 and 206 may be disposed. A solenoid valve 202 may be disposed such that the valve 202 may isolate or interrupt fluid flow between the supply port 104 and the delivery port 106. The supply port 104 may be in fluid communication with a supply chamber S and the delivery port 106 may be in fluid communication

TABLE 1

Example of Indicator Lamp Codes

| Occasion | On | Off | Flutter | Flash | Note |
| --- | --- | --- | --- | --- | --- |
| System Power up | — | — | Yes | Yes | Indicates system is operational and demonstrates lamp flutter. |
| Pressure in Range | — | Yes | — | — | Indicates system not filling tires. |
| During Tire Fill | Yes | — | — | — | System senses pressure lower than target setting. |
| During Sleep Mode | — | — | Yes | — | Flutters every few minutes to indicate system has power. |
| Enhanced Event | — | — | Yes | — | Indicates excessive fill times that may require immediate attention. |
| System Error | — | — | — | Yes | Chronic system errors indicated at power up by flashing error code three times. |

Electrical leads 116 may enter the housing 102 through a fluid-tight orifice 118. Such leads 116 may provide electrical power for a solenoid valve and the indicator lamp 114 and also provide power and communication with an ECB. Such leads 116 may connect to a source such as power systems already present on the vehicle. Such an onboard system may be the anti-lock brake system (ABS), direct feeds from the vehicle battery or alternator, or other vehicle sources of this nature. Alternately, the power source may be a power supply external to the vehicle. Such a power supply may be a battery, fuel cell, solar cell, or a dynamo or other power generating or power storage device. A dynamo may rely on air current generated by the inflation system or rely on air current generated by motion of the vehicle. Other current generating sources may rely on conversion of kinetic energy with a delivery chamber D. The supply chamber S and delivery chamber D form part of fluid channels 204 and 206, respectively.

The solenoid valve 202 may be disposed such that the valve 203 may control flow between the channel 204 and channel 206 and thus isolate the supply chamber S from the delivery chamber D. Actuation of the solenoid valve 202 may controlled by an electronic control board (ECB) 208. Data regarding the state of the inflation system may be received from a supply pressure sensor 210 and a distribution pressure sensor 212. The state data may be used to determine if the solenoid valve 202 is required to be in the open or closed position. A bleeder valve 216 may be in fluid communication with fluid channel 206, such as by means of a connecting channel 214. The bleeder valve 216 may be operated so as to depressurize the delivery side of the ECM 100 or the entirety of the ECM 100 when the solenoid valve 202 is in the open position.

Figure 3:
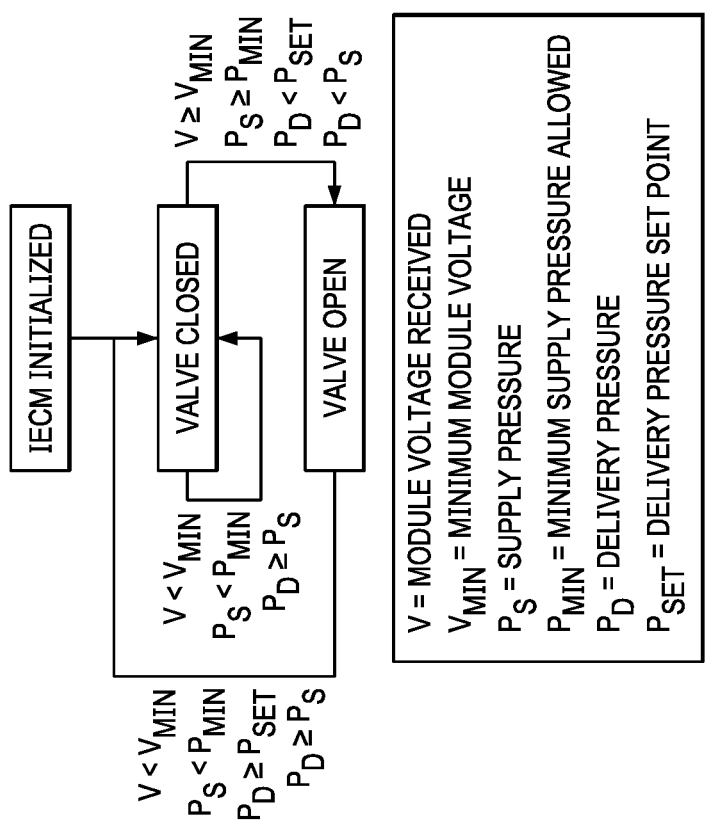
FIG. 3 displays an embodiment of a state diagram of program logic for an embodiment of an electronic control module.

A state diagram for the solenoid valve 202 may be seen in FIG. 3. As may be seen in the state diagram, the solenoid valve 202 may be in the closed position if the following conditions are present; low or no power, supply pressure is below the operating threshold, delivery pressure is at or above its set point. The solenoid valve 202 may be in the open position if the following conditions are present; power is present and at required levels, supply pressure is above its minimum operating threshold, delivery pressure is below its set point, and supply pressure is greater than delivery pressure. For the valve 202 to transition from the closed state, all of the open state conditions must be met and should any of the open state conditions fail to continue to be met the valve may close. The open position of the solenoid valve 202 allows fluid communication between supply chamber S and delivery chamber D, whereas the closed position interrupts fluid communication between the chambers S and D and thus isolates the chambers S and D from one another. An advantage of this programmed logic monitoring of the pressure source reservoir is the elimination of the need for a pressure protection valve in the inflation system. The state diagram provides a visual representation of program logic that may serve as an ECM control algorithm.

Figure 4A:
FIG. 4A illustrates an embodiment of an initialization and password screen of an application for controlling an electronic control module.
Figure 4B:
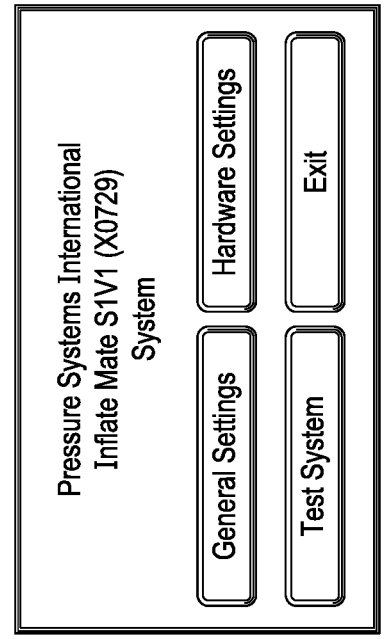
FIG. 4B illustrates an embodiment of a main menu screen of an application for controlling an electronic control module.

The ECM may be controlled through a user interface that permits a user to access and change various settings. One embodiment of such an application can be seen in FIGS. 4A through 4L. This embodiment illustrates application based on a series of screens. The application may be a standalone application installed on a personal computer or local server, or may be provided as a service through a web browser. At application initiation, an opening screen (FIG. 4A) may prompt the user to input a password. The user may be offered the option to proceed with the access operation by selecting the "Ok" button or may cancel the access operation by selecting the "Cancel" button.

If the user opts to select "Ok", the application may transition to a menu screen (FIG. 4B) offering the user access to a "General Settings", "Hardware Settings", or "Test System" screen or menu by selecting the appropriate button on the screen.

Selecting the "General Settings" button may communicate to the application to transition to the associated menu screen (FIG. 4C) from which a series of further options may be presented. The user may select to turn the system on or off by selecting on the button associated with such an action. Other options available at the "General Settings" screen may include proceeding to further screens by selecting buttons such as a "Set Pressure", "Network", or "Vehicle", each of which will signal the application to open a screen with options and settings appropriate to the selected button.

Selecting the "Set Pressure" button may communicate to the application to transition to a screen (FIG. 4D) at which the user may input a desired delivery pressure setting. The user may type or otherwise enter a numeric value that the user desires the ECM to regulate as the system delivery pressure. The user may be limited to select from a delivery pressure range of 75 psi to 120 psi. The user may then opt to send the inputted value to the application by selecting an "Ok" button on the screen or the user may opt to cancel the setting of the delivery pressure by selecting a "Cancel" button on the screen. In some embodiment, selecting the "Cancel" button after inputting a pressure value will return the input area to a blank state and a second selection of the "Cancel" button will exit the "Set Pressure" screen. In other embodiments, a first select of the "Cancel" button may immediately exit the "Set Pressure" screen.

Selection of the "Vehicle" button on the "General Settings" screen may communicate to the application to transition to a screen (FIG. 4E) on which identifying or other relevant information about the vehicle to which the ECM is mounted may be displayed. The "Vehicle" screen any also maintain buttons allowing the user to edit said identifying information or to exit the screen. Each line of identifying information may have an edit button associated with that line of information, thus allowing the user to edit only the desired information. For exemplary purposes the screen is shown to display three lines of identifying information with a "Edit 1", "Edit 2", and "Edit 3" button linked to each line of information respectively. Selection of the "Exit" button may communicate to the application to transition back to the "General Settings" screen, yet in other embodiments selection of the "Exit" button may communicate to the application to completely exit to the initial opening screen or otherwise exit the user from the application.

Selection of a button relating to editing the identifying information may result in the transition to an input screen (FIG. 4F) through which the user may enter the desired information into an input field. Upon entering the desired identifying information, the user may select the "Ok" button to accept the new information and overwrite the existing stored information for the associated line on the "Vehicle" screen. The user may opt to cancel any entered changes by selecting a "Cancel" button prior to selecting the "Ok" button. Selection of the "Cancel" button may result in the data input field being returned to a blank state with a second select of the "Cancel" button returning the user to the "Vehicle" screen. In the event that no new data has been entered into the input field, the first select of the "Cancel" button may immediately return the user to the "Vehicle" screen. In other embodiments, any select of the "Cancel" button may return the user to the "Vehicle" screen.

Selection of the "Network" button on the "General Settings" screen may communicate to the application to transition to a screen (FIG. 4G) through which changes to the network setting of the ECM may be altered. Such a screen may offer the option to set the SSID, set the network address, set the password, or exit the screen through the selection of a corresponding button. Selection of the "Set SSID", "Set Address", and "Set Password" buttons may open a screen or dialog box at which changes to the associated information may be entered and saved to the system. Selection of the "Exit" button may result in the transition back to the "General Settings" screen. In other embodiments, selection of the "Exit" button may result in the application closing completely.

Again, referring to FIG. 4B, selection of the "Hardware Settings" button may communicate to the application to transition to a screen (FIG. 4H) that maintains buttons for making alterations to settings related to the warning and indicator lamp components. Selecting the "Enhanced Warning" button may communicate to the application to transition to a screen (FIG. 4I) through which changes may be made to setting concerning the Fill Event Value alerts and information. The Fill Event Value, or FEV, is disclosed in detail below. The "Enhanced Warnings" screen may display information concerning the current alerts settings and maintain buttons to adjust said settings. Such settings and the corresponding buttons may include "Display Every", "When Above FEV", "Disable", and an "Exit" button. Selecting the "Display Every" button may open another screen or dialog window wherein the user may enter a value corresponding to how often the alert will be displayed. Selecting the "When Above FEV" button may open another screen or dialog window wherein the user may enter a value corresponding to at what FEV an alert may be displayed. Selecting the "Disable" button may open another screen or dialog window wherein the user may enter a value corresponding to time period to delay the display of an alert. Selection of the "Exit" button may result in the transition back to the "Hardware Settings" screen. In other embodiments, selection of the "Exit" button may result in the application closing completely or another screen in the nested hierarchy of screens.

Selecting the "Lamp Flutter Settings" button from the "Hardware Settings" screen may communicate to the application to transition to a screen (FIG. 4J) whereat changes may be made to settings concerning the indicator lamp. The "Lamp Flutter Settings" screen may display information as to the current settings for the indicator lamp and maintain buttons that enable the alteration of said settings. Such settings and the corresponding buttons may include a "Low", "High", "Flash", "Test", and an "Exit" button. Selecting the "Low" button may open another screen or dialog window wherein the user may enter a value to configure the Low Brightness setting for the indicator lamp. Selecting the "High" button may open another screen or dialog window wherein the user may enter a value to configure the High Brightness setting for the indicator lamp. These settings may allow the user to adjust the lower and upper luminosity settings of the indicator lamp. Selecting the "Flash" button may open another screen or dialog window wherein the user may enter a value to configure time interval between flashes of the indicator lamp. Selection of the "Test" button may allow the user to initiate a test pattern of indicator lamp illumination to verify the current settings are as desired. Selection of the "Exit" button may result in the transition back to the "Hardware Settings" screen. In other embodiments, selection of the "Exit" button may result in the application closing completely or another screen in the nested hierarchy of screens.

Again, referring to FIG. 4B, selection of the "Test System" button may communicate to the application to transition to a screen (FIG. 4H) that maintains buttons for initiating a variety of testing protocols. Said screen may display the current operational status of particular system components so as to allow the user to know to what state a test protocol should transition the associated component. Such protocols and the corresponding buttons may include a "Lamp On/Off" test, a "Fill On/Off" test, a "Delivery Test" feature, and an "Exit" button. Selecting either the "Lamp On/Off" or "Fill On/Off" button may start or stop operation of the associated system function and thus allow the user to verify the system is fully functional. Selection of the "Exit" button may result in the transition back to the "Hardware Settings" screen. In other embodiments, selection of the "Exit" button may result in the application closing completely or another screen in the nested hierarchy of screens. Other test screens may be provided to test other features of the ECM, such as light illumination, valve actuation, network ping and battery life.

Figure 4D:
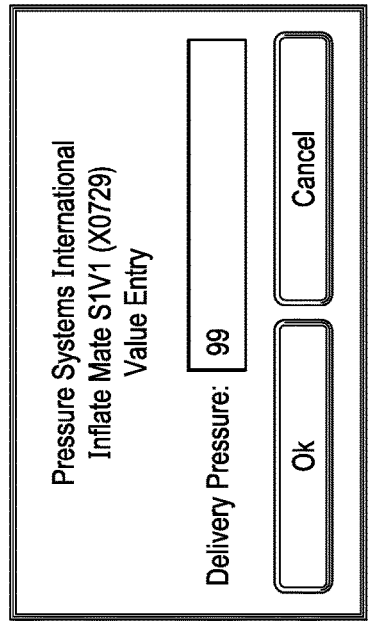
FIG. 4D illustrates an embodiment of a delivery pressure settings screen of an application for controlling an electronic control module.
Figure 4F:
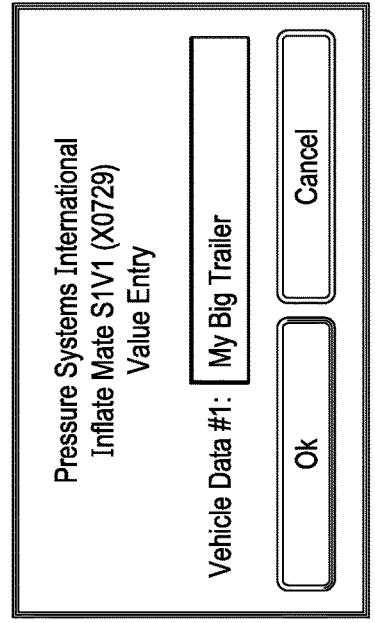
FIG. 4F illustrates an embodiment of a vehicle information entry screen of an application for controlling an electronic control module.
Figure 4C:
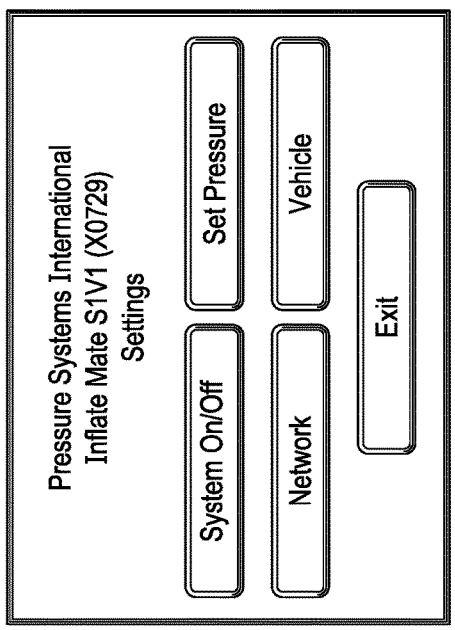
FIG. 4C illustrates an embodiment of a general settings screen of an application for controlling an electronic control module.
Figure 4E:
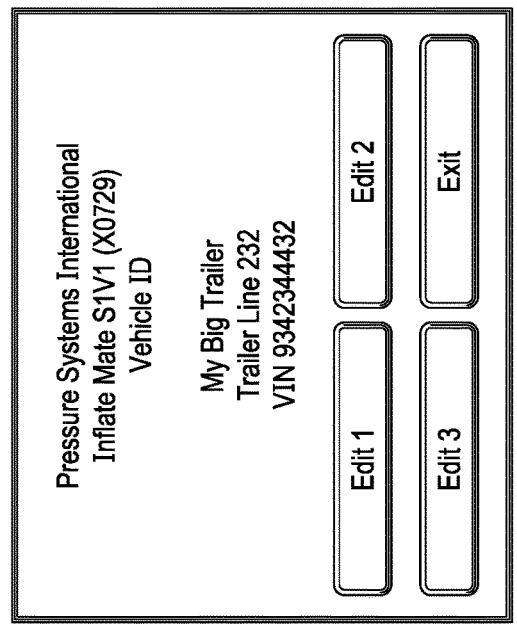
FIG. 4E illustrates an embodiment of a vehicle information screen of an application for controlling an electronic control module.
Figure 4H:
FIG. 4H illustrates an embodiment of a hardware settings screen of an application for controlling an electronic control module.
Figure 4I:
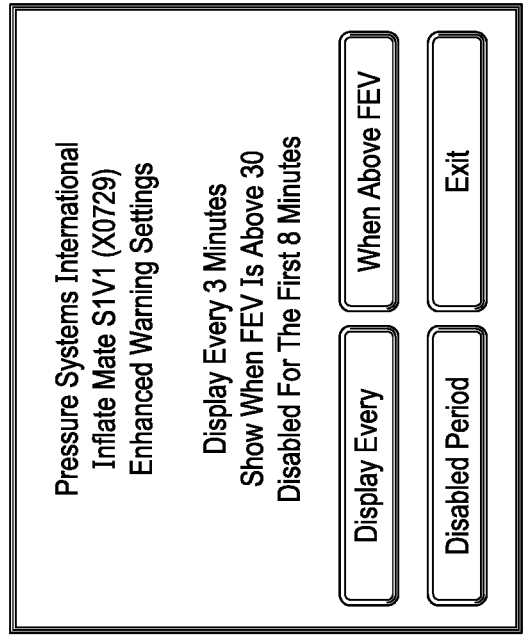
FIG. 4I illustrates an embodiment of a warnings settings screen of an application for controlling an electronic control module.
Figure 4G:
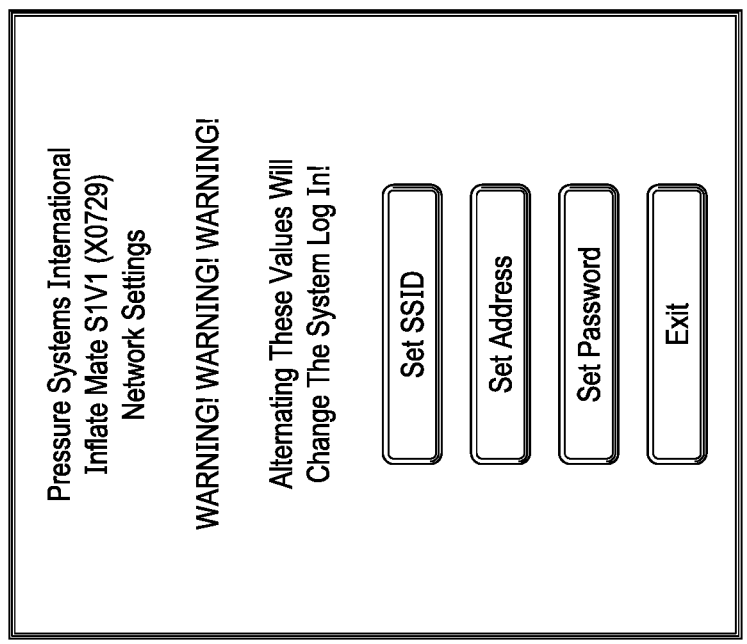
FIG. 4G illustrates an embodiment of a network settings screen of an application for controlling an electronic control module.
Figure 4K:
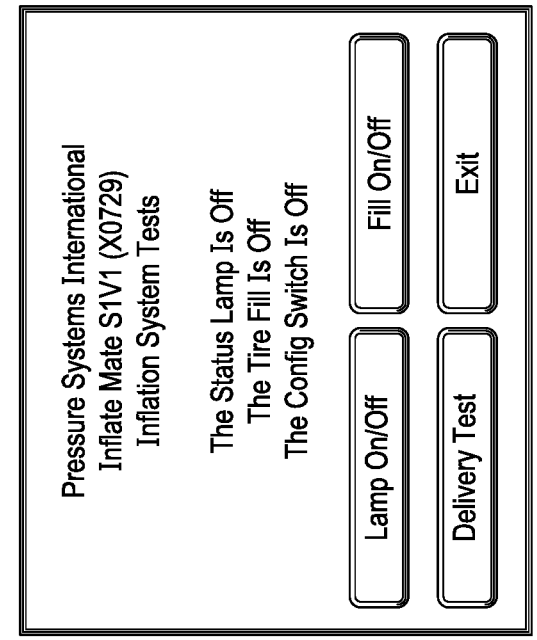
FIG. 4K illustrates an embodiment of an inflation system tests screen of an application for controlling an electronic control module.
Figure 4J:
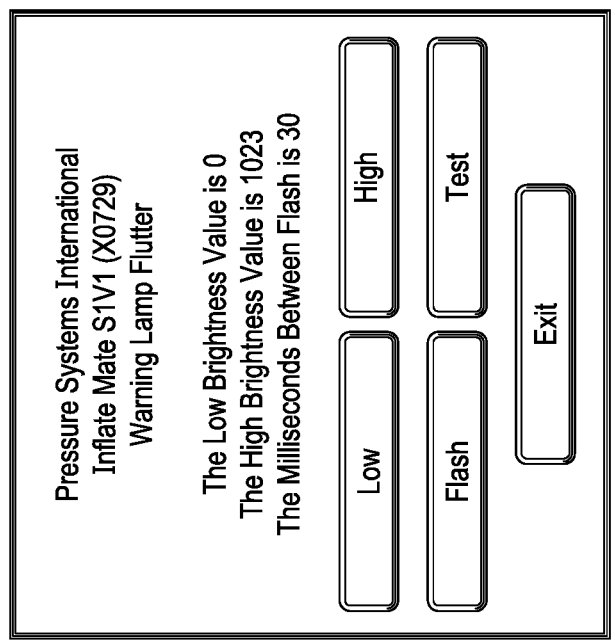
FIG. 4J illustrates an embodiment of indicator lamp settings screen of an application for controlling an electronic control module.
Figure 4L:
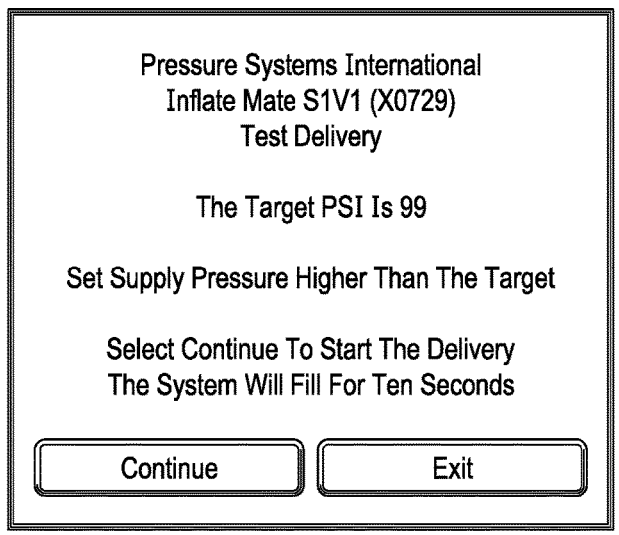
FIG. 4L illustrates an embodiment of a test screen of an application for controlling an electronic control module.

In the embodiment of FIG. 4K, selection of the "Delivery Test" button may communicate to the application to transition to a screen (FIG. 4L) that maintains buttons for initiating a test protocol related to fluid delivery to the tires. Said screen may display pertinent information such as the current target tire pressure for the delivery system to maintain, instructions to set the supply pressure higher that the target pressure, and information pertaining to the actual fill event that may occur as part of the delivery test protocol. A "Continue" and an "Exit" button may be displayed on the screen so that the user may decide to initiate the delivery test protocol or to cancel said operation. Selection of the "Exit" button may result in the transition back to the "Hardware Settings" screen. In other embodiments, selection of the "Exit" button may result in the application closing completely or another screen in the nested hierarchy of screens.

Another embodiment of a controller application can be seen in FIGS. 5A, 5B, 5C, 5D and 5E. This embodiment illustrates a web-based application based on a series of screens. At application initiation, an opening screen (FIG. 5A) may display the current state of a set of system parameters. The parameters may include, but not be limited to, the System State, Tire Pressure Setting, Tire Pressure Reading, and Tank Pressure Reading. The afore mentioned parameter names correspond to system parameters as follows; System State corresponds to whether the ECM is on or off, Tire Pressure Setting corresponds to the system set point for desired tire pressure level, Tire Pressure Reading corresponds to the tire pressure as communicated from the tire pressure sensors, and Tank Pressure Reading corresponds to the pressure as measured in the system pressure source reservoir. The opening screen may also include a button, link, or tab to access further features of the application. Such a button may be labeled "Menu" or any other appropriate term.

The "Menu" button may transition the user to a nested screen that allows access to further nested function and features of the application. Such a "Menu" screen (FIG. 5B) may include buttons, links, or tabs to features such as parameter setting, an event log, a system menu, or the ability to exit the application. Such buttons may be labeled as "Set Pressure", "Events", "System Menu", and "Exit".

The "Events" button may access a screen or tab (FIG. 5C) in which system event data may be displayed. Such events may include the period of time which the inflation system has spent supplying fluid to the tires and the time period for which there may have been a low-pressure event in the reservoir. Other events that may be monitored may include 'Event Percentage' and 'low Supply Percentage'. Such events may monitor the time that the system was engaged in filling tires as a percentage of operation time and the time there was a low supply event as a percentage of operation time, respectively. The percentage-based events may allow a fleet manager to set operational parameters for trucks and trailers based on tire history. For example, if the percentage events are in the 5% region then the required action is to check the tires and evaluate the need for further action. Next, if percentage events are in or over the 10% region, then the vehicle needs to be brought to the nearest service center for immediate evaluation by a technician or mechanic. A final trigger could then be if the percentage events are at or exceeding 50%, the vehicle or trailer needs to be immediately taken from service. The events listed are exemplary and are not intended to constitute a limit as to all events that may be displayed. Such a screen may also contain a button or other interactive device to reset the events displayed. Further events may require the use of an SD card or other removable memory device to record the event data. The "Events" screen may also support the ability to exit the application.

The "System Menu" button may access a "Systems" screen or tab (FIG. 5D) which support access to features that are relevant to the use of the application and the use of the ECM. Such features may include the ability to turn the system on, to enter a system test, access hardware associated with the system, and access network connection information and controls. The ability to exit the application may also be supported at the "Systems" screen.

Figure 5A:
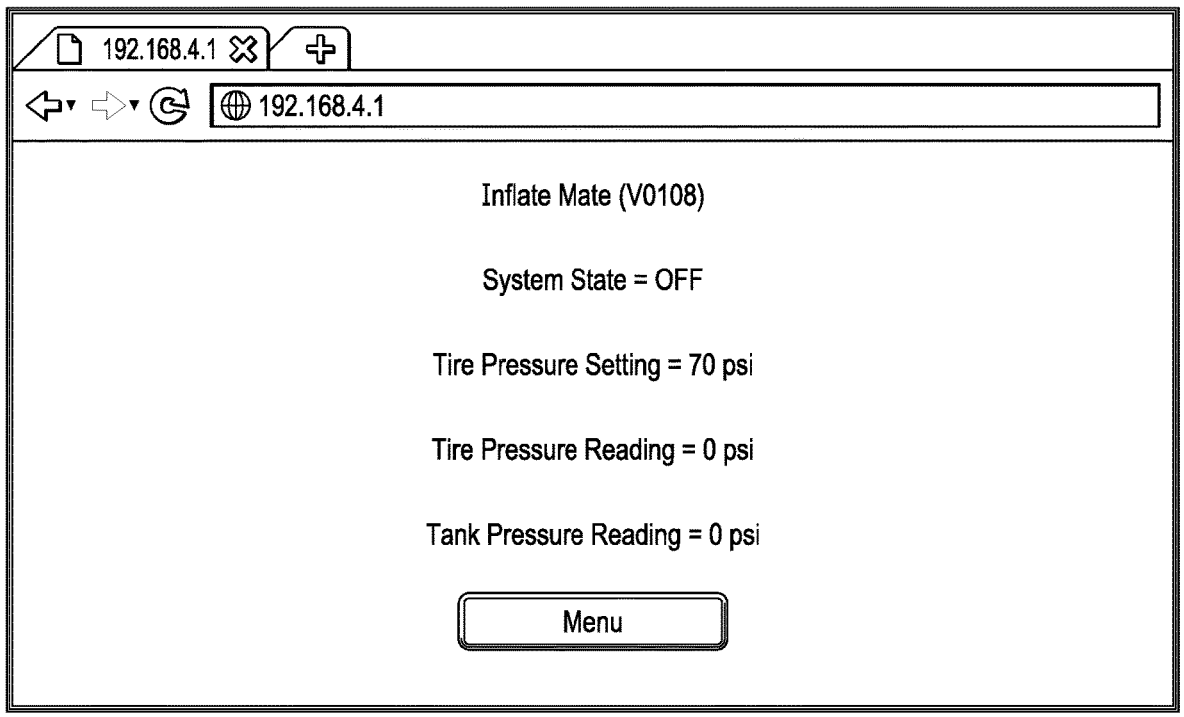
FIG. 5A illustrates an embodiment of a status screen of a browser-based application for controlling an electronic control module.
Figure 5B:
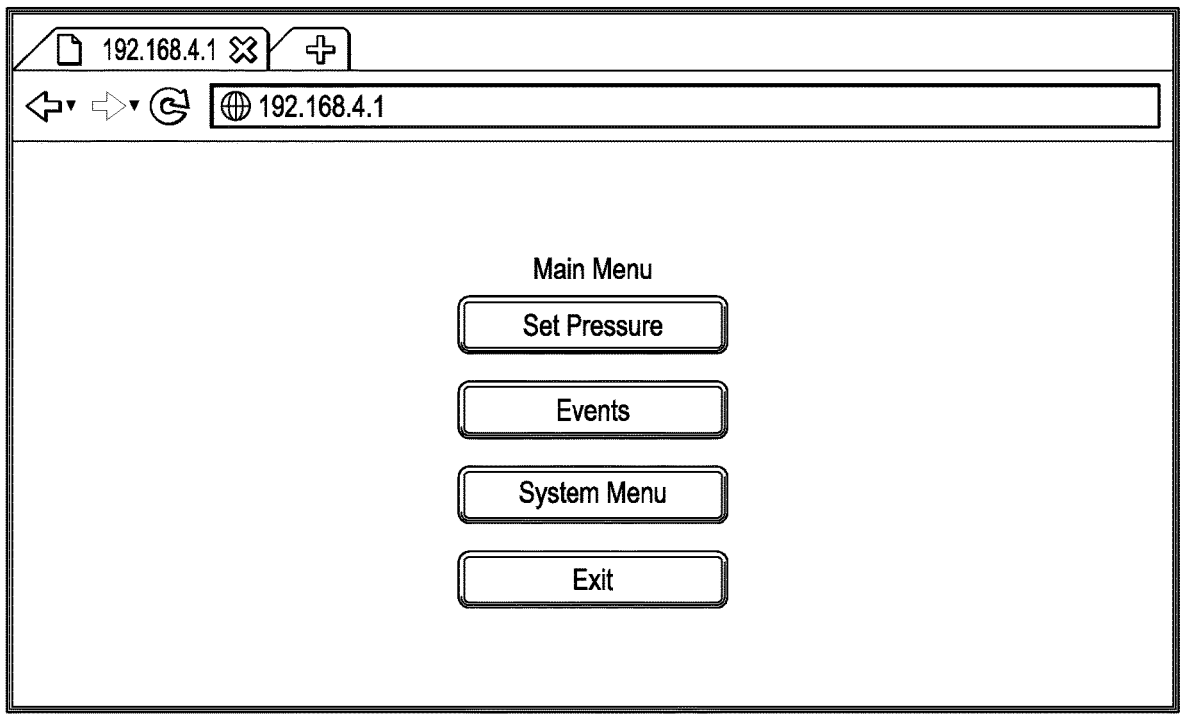
FIG. 5B illustrates an embodiment of a configuration screen of a browser-based application for controlling an electronic control module.
Figure 5C:
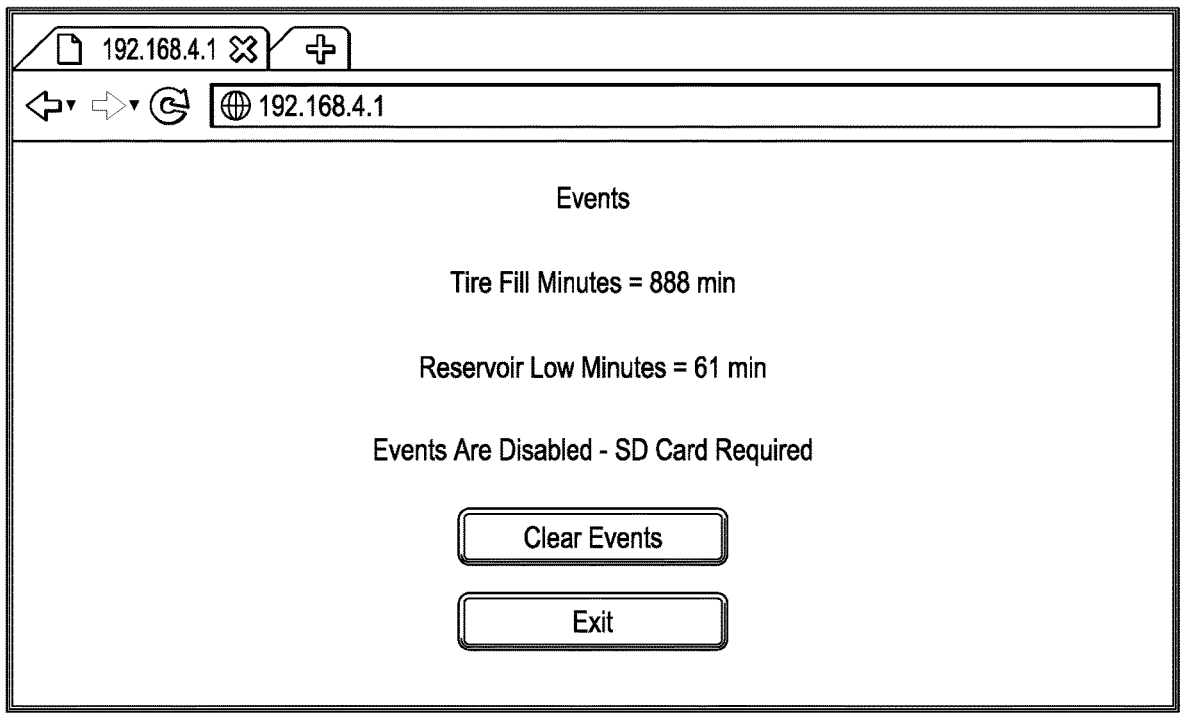
FIG. 5C illustrates an embodiment of another configuration screen of a browser-based application for controlling an electronic control module.
Figure 5D:
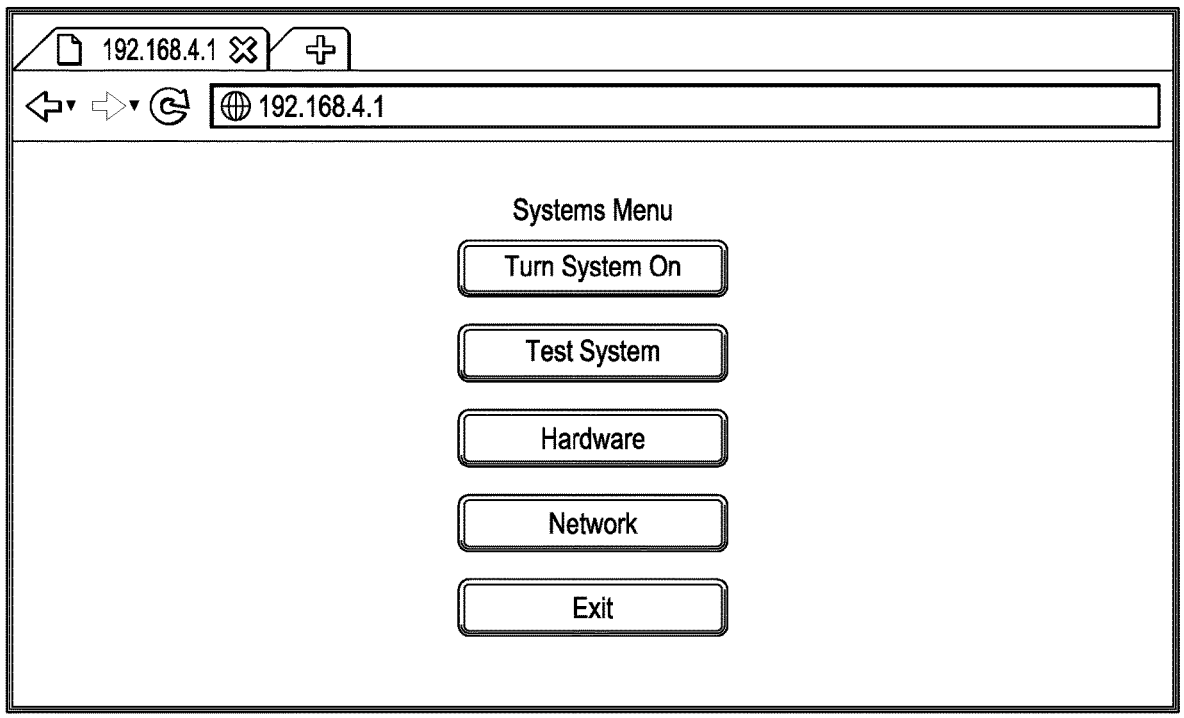
FIG. 5D illustrates an embodiment of a log screen of a browser-based application for controlling an electronic control module.
Figure 5E:
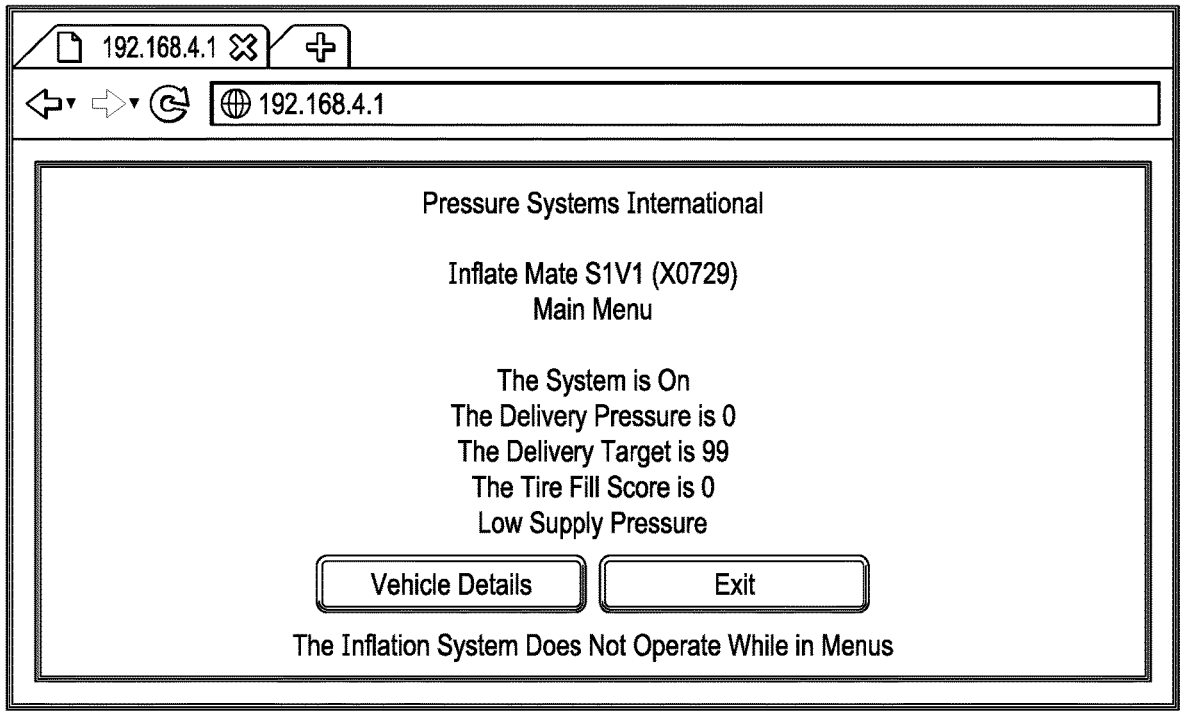
FIG. 5E illustrates another embodiment of a screen of a browser-based application for controlling an electronic control module

Another embodiment of such an application may comprise a Main Menu that is accessed through a web browser when connected to the wireless network of the ECM. As seen in FIG. 5E, the Main Menu screen may contain general information near the top of the screen. Such information may include the names of the manufacturer, software, and particular screen. A version number of the software may be included too.

The middle of the Main Menu screen may display pertinent system information such as system status (on/off), the delivery pressure, the desired or target delivery pressure, data on the ratio of the amount of time needed to maintain the system pressure (aka Tire Fill Score), and system warnings (i.e. Low Supply Pressure alert).

Towards the bottom of the Main Menu screen, there may be buttons to access other screens or to exit the application. Below said buttons, there may be instructional information such as a reminder that the inflation system does not operate while the software menus are open. Other screens may include a Vehicle Details screen where the user may enter ID codes for the system.

Figure 6:
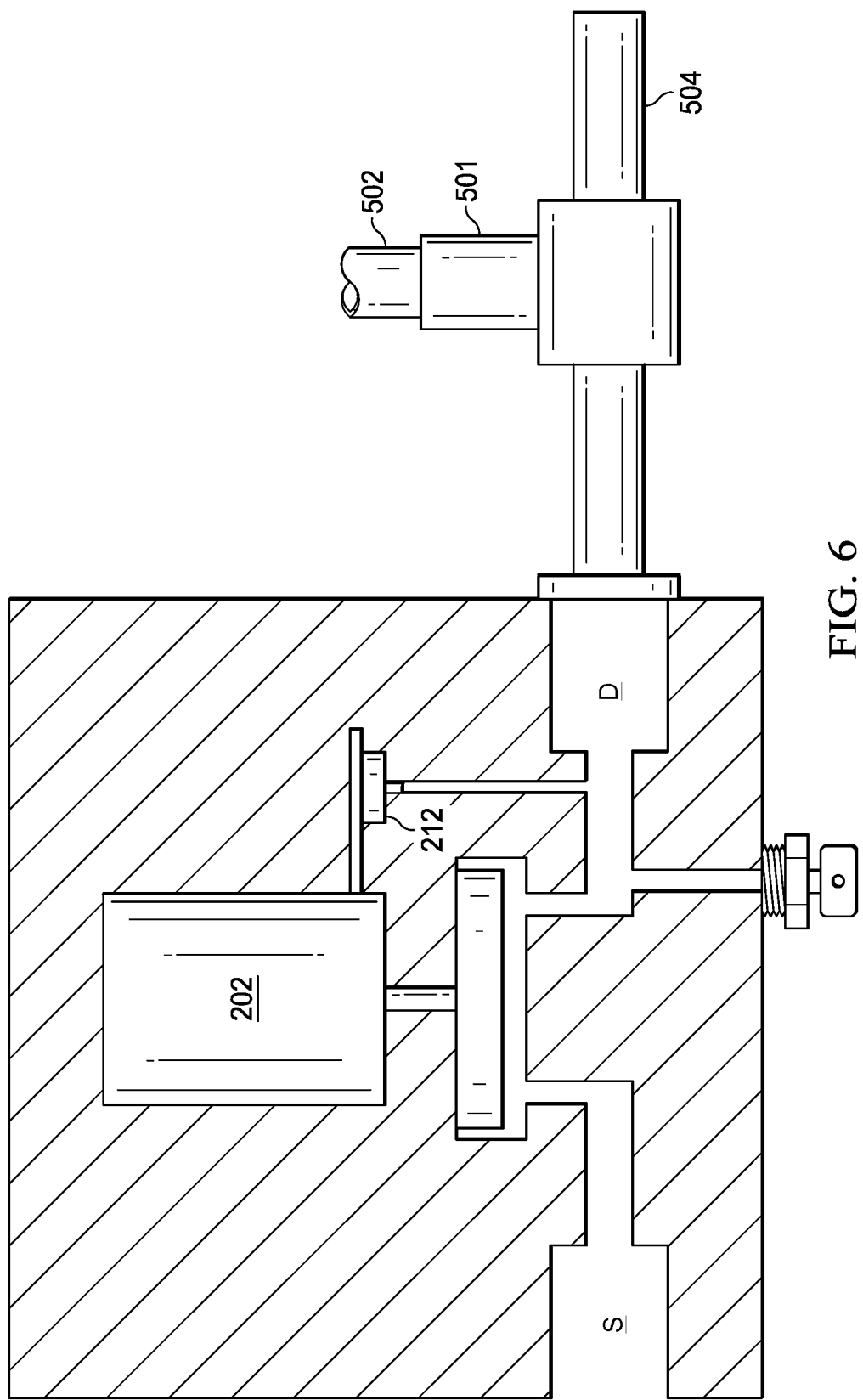
FIG. 6 illustrates an embodiment of an ECM having a single pressure sensor.

In the embodiment of FIG. 6, a single pressure sensor 212, single solenoid valve 202, and a pressure protection valve 501 may be used to control air flow to the tires. The solenoid valve may be capable of operating at up to 10 bars (145.04 psi) of pressure and may be electrically actuated. The pressure sensor 212 may monitor tire pressure and regulate air flow from a pressure reservoir to the tires based on the current tire pressure versus the desired tire pressure. The pressure protection valve 501 may be located downstream of the ECM 100 and may act to isolate the brake system 502 (which may be, for example, powered by the vehicle air brake pressure supply) from the tire inflation system 504 in the event of a leak or failure on the tire inflation lines. Such a feature may insure that the vehicle brake system continues to work even if there is a catastrophic failure of the tire monitoring side of the system.

In some embodiments of an ECM utilizing a single pressure sensor, a pressure pulse method may be implemented to determine supply side pressure. In such an embodiment, a solenoid valve may be opened and closed in rapid succession so as to create a pressure bubble on the delivery side and into a receiver. Said receiver may be a tube or pressure chamber having a size and shape matched to an algorithm running in a processor on an ECB. Such an algorithm may compare the signal generated by the pressure sensor to threshold pressure criteria as the pressure bubble passes through the sensing range of the pressure sensor. The data from the pressure sensor may be employed by an ECB to determine whether the supply side maintains adequate pressure for proper inflation should the solenoid valve open for tire inflation.

Figure 7:
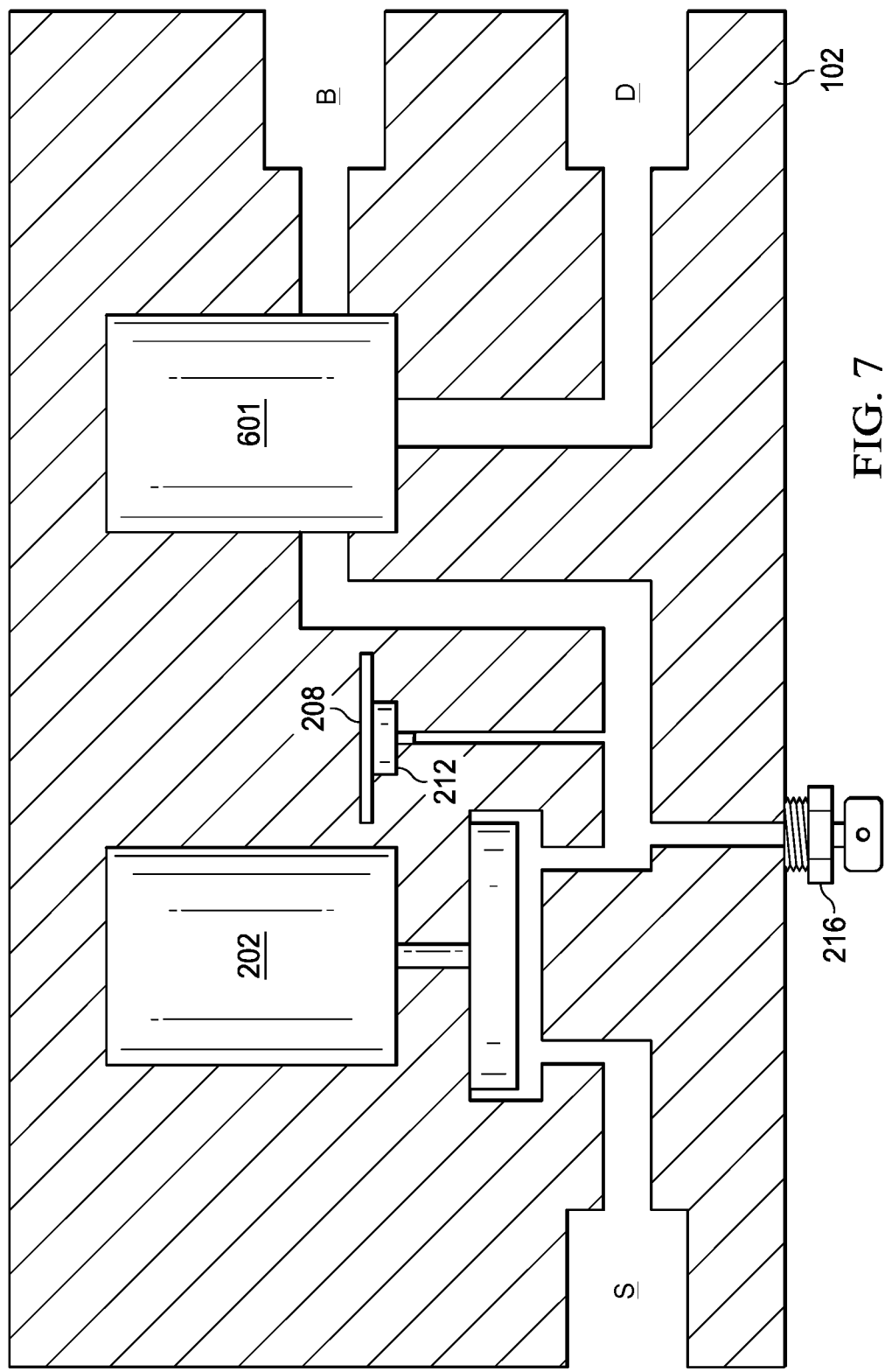
FIG. 7 illustrates an embodiment of an ECM having a single pressure sensor disposed between two solenoid valves.

In another embodiment of an ECM with a single pressure sensor 212, as seen in FIG. 7, a second solenoid valve 601 may be disposed such that the pressure sensor 212 is located between the first and second solenoid valves 202 and 601. In this embodiment, a first solenoid valve 202 regulates flow from the pressure reservoir into the supply inlet S of the ECM 100 while a second solenoid valve 601 regulates the flow of fluid to the brake delivery outlet B and the auxiliary outlet D of the ECM 100. The auxiliary outlet D may be dedicated to secondary systems such as tire inflation systems, air suspension systems, and other non-brake systems. The second solenoid valve 601 may be of a 3/2 configuration and allow the ECM 100 to select from alternate flow paths on the delivery side B or D of the ECM 100. Alternately, the second solenoid valve 601 may be of a 3/3 configuration, thus allowing simultaneous flow to both outlets B and D with the ability to isolate flow to only the brake system (outlet B) in the event of a leak or failure in the auxiliary system.

Figure 8A:
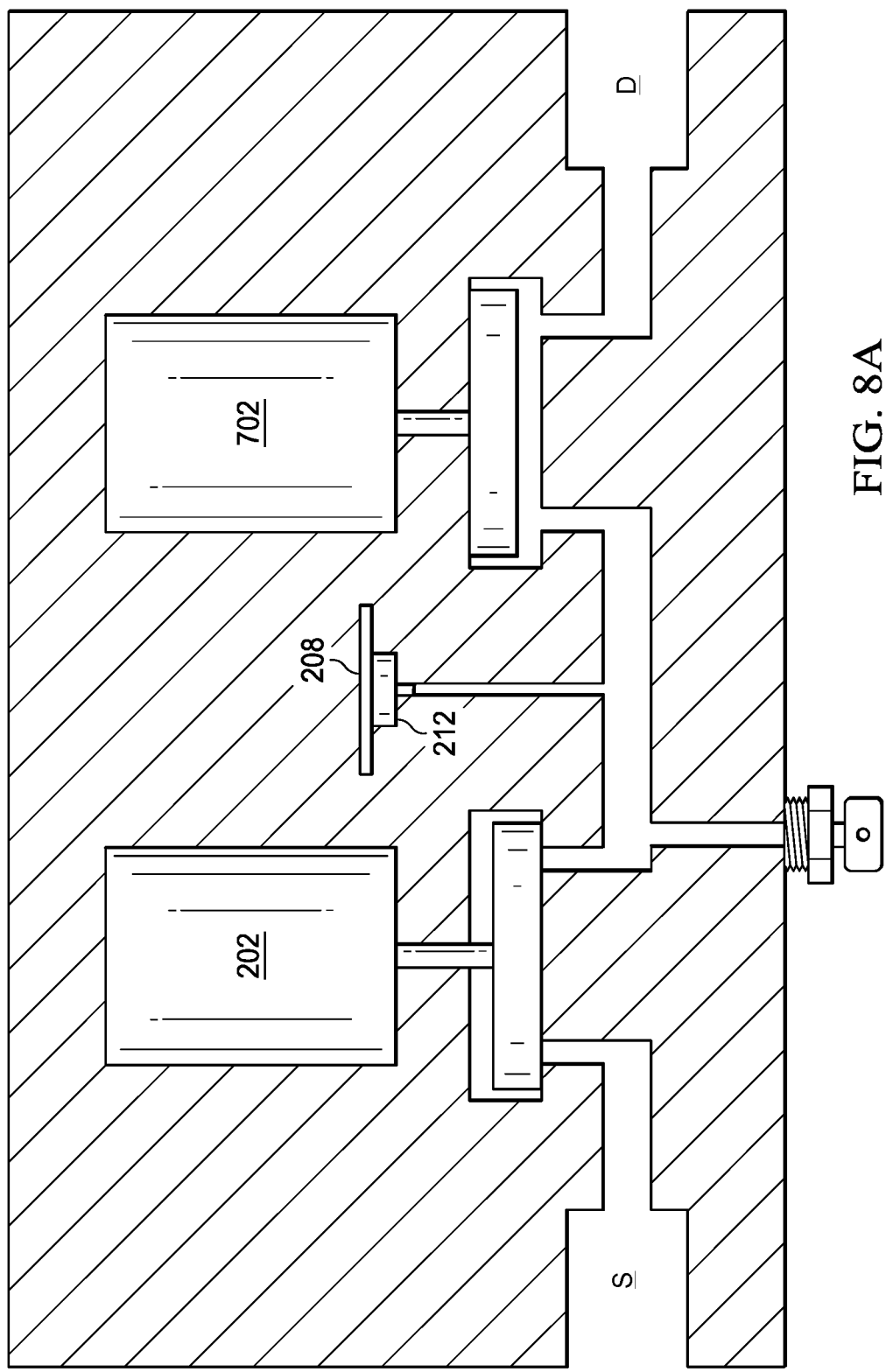
FIG. 8A illustrates another embodiment of an ECM having a single pressure sensor disposed between two solenoid valves in a first open/closed configuration.
Figure 8B:
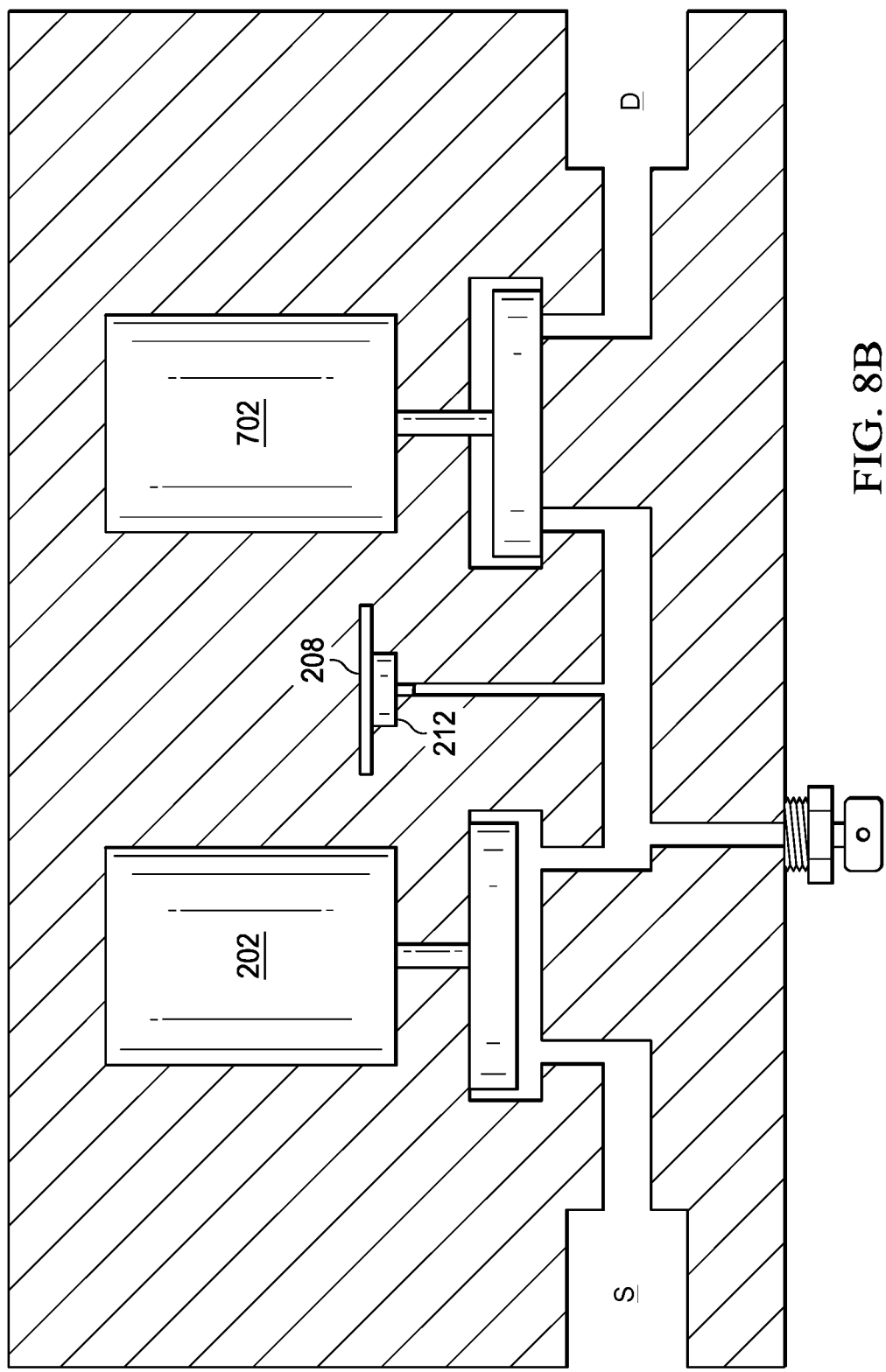
FIG. 8B illustrates the embodiment of FIG. 7 in a second open/closed configuration.

In yet another embodiment of an ECM with a single pressure sensor 212 and a dual solenoid valves 202 and 702 configuration, the pressure sensor 212 may be disposed between the first and second solenoid valves 202 and 702 so as to monitor either the supply pressure or the pressure on the delivery side dependent on the configuration of which valve 202 or 702 is open and which is closed. For example, as seen in FIG. 8A, with the first solenoid valve 202 in the closed position and the second valve 702 in the open position, the pressure sensor 212 is communication with the pressurized fluid on the delivery outlet D, such as monitoring the pressure in a set of tires. Conversely, as in FIG. 8B, with the first solenoid valve 202 in the open position and the second solenoid valve 702 closed, the pressure sensor 212 is in communication with the pressurized fluid from the supply inlet S. With both valves 202 and 702 open, then the sensor 212 monitors fluid pressure the overall system pressure of both the supply inlet S and delivery outlet D of the ECM 100. The addition of a flow sensor (not shown) may allow the ECM to determine if the fluid flow is in the intended direction, which is usually from the pressure source to the delivery outlets.

The inflation electronic control module may employ an electronic control board (ECB) as the system control mechanism. An ECB may be weather and mechanical shock resistant. For example, the electronic modules may be potted or otherwise sealed. Such a control board may include serial communication ports and also wireless reception and transmission capabilities to allow an ECM to communicate with external entities. An ECM may communicate with a variety of devices and systems, such as diagnostic equipment, calibration equipment, telemetric systems, and in-cab displays or monitors. System control may include functions such as control of the one or more solenoid valves through data received from one or more of pressure sensors. The pressure sensors may be mountable on an ECB and communicate with corresponding fluid channels. The above-referenced logic may be implemented using an ECB and pressure sensors. An ECB for the ECM may also contain components to record an event log for the ECM. Such events may include, but not be limited to, the number of open and close cycles for a period of time, which state conditions necessitated the solenoid valve(s) to cycle from open to close, reservoir status, any other data pertinent to the operation, maintenance, trouble shooting, performance evaluation, or technical improvement of an ECM and the inflation system.

An ECB may support pulse width modulation (PWM) for various components of the ECM. The PWM function may be used with a solenoid valve to reduce the power consumption of the valve and aid in preventing elevated temperatures in the valve. Additionally, the rate or length of pulses, or even complete disengagement of the PWM feature, may be desirable in cold weather climes. The resulting additional heat produced by the valve may be used for deicing procedures or to prevent or hinder icing.

Also, PWM protocols may be applied to an indicator lamp such that the nature of the modulated signal communicates what visual signal said lamp is to display. For example, when a signal of particular pulse rate and length is received by the indicator lamp, then lamp may then display a particular color, set of colors, or other variation of indications that has been designated to relay specific information to the observer.

Some such data that may captured and communicated by the ECM may concern the pressure required to maintain the target tire pressure over an interval of time. Collected data is translated into a value, known as a Fill Event Value or FEV, wherein said FEV indicates how often a tire received fill events. Thus, a low FEV score may indicate a tire in good operating condition whereas a high FEV may indicate a tire issue that requires attention so as to prevent a hazard.

Such an FEV score may be accessed through the Wi-Fi interface but may also trigger a warning that is communicated through the indicator lamp 114. For example, if a high FEV is detected then a blinking or fluttering pattern may be transmitted to said lamp for immediately alerting a driver to a potentially hazardous condition. The FEV to trigger lamp illumination may be programmable as may be the specifics of the transmitted lamp illumination pattern. Such specifics may include illumination intensity, the cycle period for the illumination sequence, and the overall duration the pattern.

For example, a moderate FEV may cause a cycle with a long period wherein long illuminations are broken by long non-illuminations. As the FEV increases, the period may shorten with short illuminations broken by short non-illuminations. Additionally, as the FEV increases so may the intensity of the illumination events.

Another example of data collected and utilized by an ECB may pertain to the monitoring of supply pressure. The system may monitor the supply pressure and translate available supply pressure into a single value known as the Supply Event Value or SEV. Such a value may represent a score on consistent and adequate supply pressure availability. A low score may indicate no or few interruptions of adequate supply pressure availability whereas a high score may represent a repeated or sustained interruption of adequate supply pressure. The SEV may be viewed through the Wi-Fi interface.

An ECB may also maintain the ability to engage the system into a sleep mode. Sleep mode may be triggered by preprogrammed events such as returning a low SEV for a set interval of time. Sleep mode may result in a unique fluttering illumination pattern being sent to the indicator lamp. For example, if an ECB detects supply pressure being below a minimum pressure value for five minutes or more, then an ECB may enter sleep mode and the indicator lamp may flutter every five minutes. Once adequate supply pressure is sensed, sleep mode may be disengaged and normal operation resumed.

An ECB may also transmit a unique CPU serial code for unit identification and record keeping functions. Said serial code may be programmed in particular configuration modes of the system and take the form of three alphanumeric fields. A description of the vehicle on which the ECM is mounted may also be included with any other identifying information stored on an ECB.

The system may also maintain a Wi-Fi SSID for when the ECM is operating through the wireless connectivity mode. An example of said SSID may be a ten-character identifier, such as 'PSI' followed a unique seven-character ID. The system may also allow the addition of trailing characters to be appended to the unique code so as to personalize or create readily identifiable network names. Such an ID code may be factory set or may be user configurable. Additionally, such an ID may have a factory default programmed at manufacture and then able to be changed to a user defined code.

Additionally, an ECB may allow for calibration and verification functions to be executed for the ECM. An ECB may also allow system set points to be input and adjusted, such as delivery pressure, supply pressure minimum values and other adjustable system parameters. Such verification, calibration, and parameter adjustment operations may be conducted through a unique software application. Such an application may be installed and executed on a computer, tablet, cellular phone, custom handheld device, or other "smart" device. Alternately, such an application may be web-based and accessed through any compatible internet browser. Additionally, the wireless capability of an ECB may allow the ECM to automatically connect to associated programs to send and receive data. Such data may include software updates, automatic parameter settings, automatic transmittal of event logs, and other pertinent system information. Other functions that may be enabled may include the ability to turn the ECM on and off, test the indicator lamp, test solenoid functionality, and to test the fill system. Such functions are for exemplary purposes and are not meant to be limiting.

Serial data ports may be provided to permit communication with a computer or handheld data retrieval unit. Such ports may be USB ports, but other serial connection types may also be utilized. Serial communication ports may be primarily utilized in production environments or other initial programming circumstances. Some parameters and functions that may be accessed by serial communication may include programming of factory set parameters, initiation of self-calibration protocols, and pre-release leak tests. Such ports may also allow verification machines to be directly connected to the ECM.

Further security protocols beyond standard wireless network protocols, such as password protection, may be used to thwart attempts to make unauthorized access into the ECM control and logging functions. In some embodiments, one additional layer of security may be implemented by the addition of a reed switch or Hall-effect sensor on an ECB. An active sensor, such as a Hall-effect sensor, in such a security feature would require that the power be sent to an ECB so that the sensor becomes active, whereas a reed switch may be passive and not require a power supply to function. To activate the sensor, a magnetic field source must be brought into range of the sensor to allow access to ECM control and logging functions. For example, a maintenance worker may have a handheld access device that pairs with the ECM security sensor to allow access to further security protocols or direct access to the system so as to make changes to system parameters or to access event logs. This security measure may be strengthened by requiring the magnetic activation to occur within a set interval of time after the initial energization of an active sensor. In situations in which changes to an ECB are not possible while the magnetic activation field is in the proximity of the sensor or switch due to risk of spurious magnetic wave reactions, the magnetic field may be applied to access a system component and then the field removed while changes to an ECB are being made. In addition to security concerns, requiring non-continuous application of the magnetic activation field may act to reduce unintended system changes. Additionally, the ECM may be configured such that operational functionality is suspended while the activating magnetic field is still within proximity of the ECM.

In some embodiments, the process for accessing ECM configuration settings may thus be as follows: 1.) Place a magnet on the appropriate spot. 2.) Wait for the indicator lamp to flash 4 to 15 times. 3.) Remove the magnet from the ECM. 4.) Wait for the indicator lamp to flash to indicate the current mode. 5.) Repeat steps 1-4 as needed to access the desired configuration tier or mode.

Alternately, a capacitance switch may be used rather than a magnetic based sensor. The capacitance switch may require the user to maintain physical contact with the ECM in some manner. The underlying security measure is that, no matter the modality chosen, the ECM has a sensing protocol to ensure that the user is in the physical proximity of the ECM when accessing the sensitive areas and data of the module. Such a security protocols aids in defeating hacking attempts that do not include the bad actor being within physical proximity of the ECM.

Additional security measures may include a tiered access system. The first access tier may be a public tier that restricts access to those that possess the Wi-Fi SSID and password information. At this access level, the user may be restricted to as what information is accessible and be limited to only viewing settings and any displayed information, such the current FEV or SEV. The next tier of access may be tied to configuration operations and require the afore mentioned magnetic security system to be engaged. Other security protocols may also be utilized to limit access to the configuration tier.

The configuration tier may be further divided into sub-tiers that are accessed through repeated triggering of a magnetic security system. The first triggering once in the configuration tier may allow the system to then be configured through the wireless interface. At this mode, user alterable system parameters may be set, network settings changed, vehicle ID codes set, and so forth. A second triggering may then put the system into a different configuration mode, a third triggering yet another mode, and so forth until a final mode is entered at which the system may be reset to the factory defaults. The resetting of parameters to the factory defaults may not fully implement until the next power up of the system.

A further security protocol may be a timed back-out function for each tier of the software and the software itself. Such a protocol may cause the software to revert to the previous data tier after a defined period of time, such as one minute. Such a protocol may also force the software to revert all the way to the main menu after a defined period of time. In some embodiments, the protocol may interrupt the wireless connection after a defined period of time. Such "back-out" or interruption may be automatic or may open a prompt that requires user input or interaction to prevent the protocol event. In some embodiments, the period of time being measured to initiate a protocol event may be reset by user interaction with the software. In some embodiments, a user will be also utilizing proximity security protocols.

A further security protocol may be that configuration tier access and configuration mode changes must be made within a designated period of time, such as three minutes. In addition to security concerns, a short window of accessibility may limit the possibility of unintended changes being made to the system. An even further security protocol may be that access is only granted when there is no connection between the ECM and any external communication network such as a Wi-Fi connection.

Automatic tire inflation systems may be used to control vehicle tire pressure by adding air to the vehicle's tires without need for a human operator to inflate the tires from an air pressure source external to the vehicle, such as a maintenance shop air supply. Generally, a tire inflation system employs a source of pressurized fluid to maintain a desired pressure in connected tires. An ECM as described herein may be used to control fluid communication between the pressure source and the tires. The ECM may thus use an electromechanical valve mechanism dependent on operational logic reliant on the differential of the desired tire pressure level and the actual tire pressure. The ECM determines if pressure in the source reservoir is sufficient to meet the pressure demand when an associated tire requires pressurization. The ECM offers data as to tire inflation event history and may offer wireless communication with associated inflation system components. The ECM permits configuration of system parameters such as supply pressure.

The ECM thus monitors both the fluid source pressure and/or pressure of the tires while maintaining an event log of system events and uses such monitoring for the control of valve positions based on the current state of the system. The ECM provides remote access such an event log remotely and permits remote adjustment of system operating parameters, such as through Wi-Fi communication with an external module that contains an interface program for the control module. The ECM may implement security protocols to be implemented to assure system and information integrity.

The foregoing inflation control module may be embodied in a variety of ways, including as described in the numbered clauses immediately following:

1. An inflation electronic control module comprising a first electronically-controllable solenoid valve disposed so as to selectively open or close fluid communication between a fluid pressure source and a vehicle tire; and a first electronic fluid pressure sensor disposed so as to detect delivery-side fluid pressure between the first electronically-controllable solenoid valve and the vehicle tire, and provide a first pressure signal corresponding to the detected fluid pressure; wherein the first electronically-controllable solenoid valve opens or closes in response to the first pressure signal.

2. The inflation control module of clause 1, wherein the first electronically-controllable solenoid valve opens if the first pressure signal indicates pressure below a threshold tire pressure, and closes if the first pressure signal indicates pressure at or above a threshold tire pressure.

3. The inflation electronic control module of clause 1, further comprising a second electronic fluid pressure sensor disposed so as to detect supply-side fluid pressure between the fluid pressure source and the first electronically-controllable solenoid valve, and to provide a second pressure signal corresponding to the detected fluid pressure; wherein the first electronically-controllable solenoid valve opens or closes in response to the second pressure signal.

4. The inflation control module of clause 3, wherein the first electronically-controllable solenoid valve opens if the first pressure signal indicates pressure below a threshold tire pressure and the second pressure signal indicates pressure at or above a threshold supply pressure, and closes if the first pressure signal indicates pressure at or above the threshold tire pressure or the second pressure signal indicates pressure below the threshold supply pressure.

5. The inflation control module of clause 4, wherein the first electronically-controllable solenoid valve opens if receiving power at or above a minimum power threshold, and closes if receiving no power or power below the minimum power threshold.

6. The inflation control module of clause 5, further comprising an electronic control board, the first electronically-controllable solenoid valve, first electronic fluid pressure sensor and second electronic fluid pressure sensor being mounted thereto and controlled thereby.

7. The inflation control module of clause 6, further comprising a power supply configured to provide a voltage signal; and the electronic control module comprising a processor configured to receive the first pressure signal, the second pressure signal from the second electronic fluid pressure sensor and the voltage signal, the processor being configured to actuate the first electronically-controllable solenoid valve based on the voltage signal, the first pressure signal and the second pressure signal.

8. The inflation control module of clause 7, wherein the threshold tire pressure and the threshold supply pressure are set at the same pressure.

9. The inflation control module of clause 1, further comprising a second electronically-controllable solenoid valve disposed so as to selectively open or close fluid communication between the first electronic fluid pressure sensor and the vehicle tire; wherein the second electronically-controllable solenoid valve opens or closes in response to the first pressure signal.

10. The inflation control module of clause 9, the second electronically-controllable solenoid valve further disposed so as to selectively open or close fluid communication between the first electronic fluid pressure sensor and an auxiliary fluid port and/or the vehicle tire.

11. The inflation control module of clause 1, further comprising a bleeder valve disposed so as to permit release of fluid pressure between the first electronically-controllable solenoid valve and the vehicle tire.

12. The inflation control module of clause 11, further comprising a pressure protection valve disposed so as to react to fluid pressure either between the first electronic fluid pressure sensor and the vehicle tire or between the fluid pressure source and the first electronically-controllable solenoid valve.

13. The inflation control module of clause 2, further comprising a user interface configured to allow adjustment of one or more of the close conditions and open conditions.

14. The inflation control module of clause 13, the user interface comprising a web browser in communication with the processor.

15. An automatic tire inflation system comprising a fluid pressure source; a vehicle tire; and an electronic control module disposed between and in sealing fluid communication with the fluid pressure source and the vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve.

16. The system of clause 15, the electronic control module further comprising a bleeder valve disposed so as to permit release of fluid pressure between the first electronically-controllable solenoid valve and the vehicle tire.

17. The system of clause 15, the electronic control module further comprising a second electronic fluid pressure sensor disposed so as to detect fluid pressure between the fluid pressure source and the first electronically-controllable solenoid valve and control operation of the first electronically-controllable solenoid valve.

18. The system of clause 17, further comprising a power supply configured to supply a voltage signal; and the electronic control module further comprising a processor configured to receive a first pressure signal from the first electronic fluid pressure sensor, a second pressure signal from the second electronic fluid pressure sensor, and the voltage signal; and wherein the processor is configured to close the first electronically-controllable solenoid valve upon the occurrence of any of the following close conditions: the voltage signal indicates no voltage or voltage below a voltage threshold, the second pressure signal indicates fluid pressure from the fluid supply source below a threshold delivery pressure, and the first pressure signal indicates pressure in the vehicle tire at or above the threshold delivery pressure; and wherein the processor is configured to open the solenoid valve upon the occurrence of all of the following open conditions: the voltage signal indicates voltage at or above the voltage threshold, the second pressure signal indicates fluid pressure from the fluid supply source at or above a threshold delivery pressure, and the first pressure signal indicates pressure in the vehicle tire below the threshold delivery pressure.

19. The system of clause 18, the system further comprising a user interface configured to allow adjustment of one or more of the close conditions and open conditions.

20. The system of clause 19, the user interface comprising a web browser in communication with the processor.

21. The system of clause 15, the electronic control module further comprising a pressure protection valve disposed so as to react to fluid pressure either between the first electronic fluid pressure sensor and the vehicle tire or between the fluid pressure source and the first electronically-controllable solenoid valve.

22. The system of clause 15, the electronic control module further comprising a second electronically-controllable solenoid valve disposed so as to selectively open or close fluid communication between the first electronic fluid pressure sensor and the vehicle tire.

23. The system of clause 22, the second electronically-controllable solenoid valve further disposed so as to selectively open or close fluid communication between the first electronic fluid pressure sensor and an auxiliary fluid port and/or the vehicle tire.

24. A method of controlling fluid to a vehicle tire, the method comprising providing an electronic control module between and in sealing fluid communication with a fluid pressure source and a vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve.

25. The method of clause 24, the electronic control module further comprising a bleeder valve disposed so as to permit release of fluid pressure between the first electronically-controllable solenoid valve and the vehicle tire.

26. The method of clause 24, the electronic control module further comprising a second electronic fluid pressure sensor disposed so as to detect fluid pressure between the fluid pressure source and the first electronically-controllable solenoid valve and control operation of the first electronically-controllable solenoid valve.

27. The method of clause 26, the electronic control module further comprising a processor configured to receive a first pressure signal from the first electronic fluid pressure sensor and a second pressure signal from the second electronic fluid pressure sensor; and a power supply configured to supply a voltage signal to the processor; wherein the processor is configured to close the first electronically-controllable solenoid valve upon the occurrence of any of the following close conditions: the voltage signal indicates no voltage or voltage below a voltage threshold, the second pressure signal indicates fluid pressure from the fluid supply source below a threshold delivery pressure, and the first pressure signal indicates pressure in the vehicle tire at or above the threshold delivery pressure; and wherein the processor is configured to open the solenoid valve upon the occurrence of all of the following open conditions: the voltage signal indicates voltage at or above the voltage threshold, the second pressure signal indicates fluid pressure from the fluid supply source at or above a threshold delivery pressure, and the first pressure signal indicates pressure in the vehicle tire below the threshold delivery pressure.

28. The method of clause 27, further comprising providing a user interface configured to allow adjustment of one or more of the close conditions and open conditions.

29. The method of clause 28, the user interface comprising a web browser in communication with the processor.

30. The method of clause 24, further comprising providing a pressure protection valve disposed so as to react to fluid pressure either between the first electronic fluid pressure sensor and the vehicle tire or between the fluid pressure source and the first electronically-controllable solenoid valve.

31. The method of clause 24, further comprising a second electronically-controllable solenoid valve disposed so as to selectively open or close fluid communication between the first electronic fluid pressure sensor and the vehicle tire.

32. The method of clause 31, the second electronically-controllable solenoid valve further disposed so as to selectively open or close fluid communication between the first electronic fluid pressure sensor and an auxiliary fluid port and/or the vehicle tire.

33. A method of controlling fluid to a vehicle tire, the method comprising providing an electronic control module between and in sealing fluid communication with a fluid pressure source and a vehicle tire via one or more fluid conduits, the electronic control module comprising a first electronically-controllable solenoid valve disposed so as to selectively open or close fluid communication between the fluid pressure source and the vehicle tire; and a first electronic fluid pressure sensor disposed so as to detect fluid pressure between the first electronically-controllable solenoid valve and the vehicle tire and control operation of the first electronically-controllable solenoid valve; and selectively opening or closing the first electronically-controllable solenoid valve based on fluid pressure sensed by the first electronic fluid pressure sensor.

34. The method of clause 33, the electronic control module further comprising a bleeder valve disposed so as to permit release of fluid pressure between the first electronically-controllable solenoid valve and the vehicle tire.

35. The method of clause 33, the electronic control module further comprising a second electronic fluid pressure sensor disposed so as to detect fluid pressure between the fluid pressure source and the first electronically-controllable solenoid valve and control operation of the first electronically-controllable solenoid valve; and the method further comprising selectively opening or closing the second electronically-controllable solenoid valve based on fluid pressure sensed by the second electronic fluid pressure sensor.

36. The method of clause 35, the electronic control module further comprising a processor configured to receive a first pressure signal from the first electronic fluid pressure sensor and a second pressure signal from the second electronic fluid pressure sensor; and a power supply configured to supply a voltage signal to the processor; wherein the processor is configured to close the first electronically-controllable solenoid valve upon the occurrence of any of the following close conditions: the voltage signal indicates no voltage or voltage below a voltage threshold, the second pressure signal indicates fluid pressure from the fluid supply source below a threshold delivery pressure, and the first pressure signal indicates pressure in the vehicle tire at or above the threshold delivery pressure; and wherein the processor is configured to open the first electronically-controllable solenoid valve upon the occurrence of all of the following open conditions: the voltage signal indicates voltage at or above the voltage threshold, the second pressure signal indicates fluid pressure from the fluid supply source at or above a threshold delivery pressure, and the first pressure signal indicates pressure in the vehicle tire below the threshold delivery pressure; and the method further comprising selectively opening the first electronically-controllable solenoid valve based on the open conditions or closing the first electronically-controllable solenoid valve based on one of the closing conditions.

37. The method of clause 36, further comprising adjusting one or more of the close conditions and open conditions using a user interface.

38. The method of clause 37, the user interface comprising a web browser in communication with the processor.

39. The method of clause 33, the electronic control module further comprising a second electronically-controllable solenoid valve disposed so as to selectively open or close fluid communication between the first electronic fluid pressure sensor and the vehicle tire; and the method further comprising selectively opening or closing the second electronically-controllable solenoid valve.

40. The method of clause 39, the second electronically-controllable solenoid valve further disposed so as to selectively open or close fluid communication between the first electronic fluid pressure sensor and an auxiliary fluid port and/or the vehicle tire; the method further comprising selectively opening or closing the second electronically-controllable solenoid valve to allow fluid communication between the fluid pressure source and an auxiliary fluid port and/or the vehicle tire.

41. The inflation electronic control module of any of the foregoing clauses further enclosed in a housing.

Although the disclosed subject matter and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

I claim:
1. A method of controlling fluid to a vehicle tire, the method comprising:
providing an electronic control module between and in sealing fluid communication with a fluid pressure source and a vehicle tire via one or more fluid conduits, the electronic control module comprising:
a first electronically-controllable solenoid valve disposed so as to selectively open or close fluid communication between the fluid pressure source and the vehicle tire; and
a first electronic fluid pressure sensor disposed so as to detect delivery side fluid pressure between the first electronically-controllable solenoid valve and the vehicle tire, the first electronic fluid pressure sensor being configured to provide a first pressure signal corresponding to the detected delivery-side fluid pressure for controlling operation of the first electronically-controllable solenoid valve; and
the first electronically-controllable solenoid valve being configured to selectively open and close based on the first pressure signal and based on a supply-side fluid pressure;
the first electronically-controllable solenoid valve being further configured to open if (a) the delivery-side fluid pressure is below a threshold tire pressure, and (b) the supply-side fluid pressure is at or above a threshold supply pressure and above the delivery-side fluid pressure; and
the first electronically-controllable solenoid valve being configured to close if the delivery-side fluid pressure is at or above the threshold tire pressure or the supply-side fluid pressure, or (ii) the supply-side fluid pressure is below the threshold supply pressure.

2. The method of claim 1, the electronic control module further comprising a bleeder valve disposed so as to permit release of the delivery-side fluid pressure between the first electronically-controllable solenoid valve and the vehicle tire.

3. The method of claim 1, the electronic control module further comprising a second electronic fluid pressure sensor disposed so as to detect the supply-side fluid pressure, the second electronic fluid pressure sensor being configured to provide a second pressure signal corresponding to the detected supply-side fluid pressure for controlling operation of the first electronically-controllable solenoid valve.

4. The method of claim 1, the electronic control module further comprising a second electronically-controllable solenoid valve;
the electronic control module being configured to selectively open or close the first electronically-controllable solenoid valve and second electronically-controllable solenoid valve so as to control fluid communication between the first electronic fluid pressure sensor and the vehicle tire so that said first electronic fluid pressure sensor may detect either the delivery-side fluid pressure or the supply-side fluid pressure.

5. The method of claim 4, the second electronically-controllable solenoid valve being configured so as to selectively open or close fluid communication between the first electronic fluid pressure sensor and an auxiliary fluid port.

6. A method of controlling fluid to a vehicle tire, the method comprising:
providing an electronic control module between and in sealing fluid communication with a fluid pressure source and a vehicle tire via one or more fluid conduits, the electronic control module comprising:
a first electronically-controllable solenoid valve disposed so as to selectively open or close fluid communication between the fluid pressure source and the vehicle tire;
a first electronic fluid pressure sensor disposed so as to detect a delivery-side fluid pressure between the first electronically-controllable solenoid valve and the vehicle tire, the first electronic fluid pressure sensor being configured to provide a first pressure signal corresponding to the detected delivery-side fluid pressure for controlling operation of the first electronically-controllable solenoid valve when fluid is provided from the fluid pressure source to said vehicle tire for tire inflation; and
the first electronically-controllable solenoid valve being configured to selectively open and close based on first pressure signal and based on a supply-side fluid pressure;
the first electronically-controllable solenoid valve being configured to open upon the following open conditions (a) the delivery-side fluid pressure is below a threshold tire pressure, and (b) the supply-side fluid pressure is at or above a threshold supply pressure and above the delivery-side fluid pressure; and
the first electronically-controllable solenoid valve being configured to close upon one of the following close conditions: (i) the delivery-side fluid pressure is at or above the threshold tire pressure or the supply-side fluid pressure, or (ii) the supply-side fluid pressure is below the threshold supply pressure; and
selectively opening or closing the first electronically-controllable solenoid valve based on the first pressure signal and the supply-side fluid pressure.

7. The method of claim 6 the electronic control module further comprising:
a processor configured to receive the first pressure signal from the first electronic fluid pressure sensor and a second pressure signal corresponding to said supply-side fluid pressure; and
a power supply configured to supply a voltage signal to the processor.

8. The method of claim 7, further comprising adjusting one or more of the control conditions using a user interface.

9. The method of claim 8, the user interface comprising a web browser in communication with the processor.

10. An inflation electronic control module comprising:
a first electronically-controllable solenoid valve configured to selectively open or close fluid communication between a fluid pressure source and a vehicle tire when the electronic control module is disposed between and in sealing fluid communication with a fluid pressure source and a vehicle tire via one or more fluids conduits; and
a first electronic fluid pressure sensor configured to detect delivery-side fluid pressure between the first electronically-controllable solenoid valve and the vehicle tire, and to provide a first pressure signal corresponding to the detected delivery-side fluid pressure for controlling operation of the first electronically-controllable solenoid valve;
the first electronically-controllable solenoid valve being configured to open upon the following open conditions: (a) the delivery-side fluid pressure is below a threshold tire pressure and (b) the supply-side fluid pressure is at or above a threshold supply pressure and above the delivery-side fluid pressure; and the first electronically-controllable solenoid valve being further configured to close upon one of the following close conditions (i) the delivery-side fluid pressure is at or above the threshold tire pressure or the supply-side fluid pressure, or (ii) the supply-side fluid pressure is below the threshold supply pressure.

11. The inflation electronic control module of claim 10 further comprising an electronic control board, the first electronically-controllable solenoid valve being mounted thereto.

12. The inflation electronic control module of claim 11 being configured to serve as an access control point for a wireless network so as to allow communication between the electronic control module and other vehicle devices.

13. The inflation electronic control module of claim 10 further comprising:
a user interface configured to allow adjustment of one or more close conditions and one or more open conditions, the user interface comprising a web browser in communication with a processor on an electronic control board, the electronic control board being a mechanical shock and weather resistant electronic control board contained within a housing for sealing the inflation electronic control module against environmental hazards.

14. The inflation electronic control module of claim 10, further comprising:
a second electronic fluid pressure sensor disposed so as to detect said supply-side fluid pressure between the fluid pressure source and the first electronically-controllable solenoid valve, and to provide the second pressure signal corresponding to the detected supply-side fluid pressure.

15. The inflation electronic control module of claim 10, wherein the first electronically-controllable solenoid valve is further configured to open only if the inflation control electronic module is receiving power at or above a minimum power threshold, and to close if the inflation electronic control module is receiving no power or power below the minimum power threshold.

16. The inflation electronic control module of claim 15, further comprising an electronic control board, the first electronically-controllable solenoid valve, first electronic fluid pressure sensor and second electronic fluid pressure sensor being mounted thereto and electronically communicating thereby.

17. The inflation electronic control module of claim 16 further comprising:
a power supply configured to provide a voltage signal;
the electronic control module comprising a processor configured to receive the first pressure signal from the first electronic fluid pressure sensor, the second pressure signal from the second electronic fluid pressure sensor and the voltage signal, the processor being configured to actuate the first electronically-controllable solenoid valve based on the voltage signal, the first pressure signal and the second pressure signal.

18. The inflation electronic control module of claim 10, further comprising a second electronically-controllable solenoid valve disposed so as to selectively open or close fluid communication between the first electronic fluid pressure sensor and the vehicle tire;
the second electronically-controllable solenoid valve being configured to open or close in response to the first pressure signal;
the second electronically-controllable solenoid valve further disposed so as to selectively open or close fluid communication between the first electronic fluid pressure sensor and an auxiliary fluid port.

19. The inflation electronic control module of claim 10 further comprising:
a second electronically-controllable solenoid valve;
the first electronically-controllable solenoid valve and the second electronically-controllable solenoid valve configured to selectively open and close so that the first electronic fluid pressure sensor may detect either the delivery-side fluid pressure or the supply-side fluid pressure.

20. The inflation electronic control module of claim 19 further comprising a flow sensor, the flow sensor disposed so as to determine a direction of fluid flow when both the first electronically-controllable solenoid valve and the second electronically-controllable solenoid valve are open.

* * * * *